United States Patent
Hwang et al.

(10) Patent No.: US 8,289,457 B2
(45) Date of Patent: Oct. 16, 2012

(54) LIQUID CRYSTAL DISPLAY INCLUDING TOUCH SENSOR LAYER AND MANUFACTURING METHOD THEREOF

(75) Inventors: Seong-Mo Hwang, Seongnam-si (KR); Young-Joon Cho, Asan-si (KR); Jae-Jin Pyun, Hwaseong-si (KR); Ki-Tae Kim, Osan-si (KR); Seung-Ho Nam, Seongnam-si (KR); Hyun-Ju Lee, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 171 days.

(21) Appl. No.: 12/965,410

(22) Filed: Dec. 10, 2010

(65) Prior Publication Data

US 2012/0033168 A1    Feb. 9, 2012

(30) Foreign Application Priority Data

Aug. 9, 2010    (KR) .................. 10-2010-0076615

(51) Int. Cl.
   *G02F 1/1335*    (2006.01)
(52) U.S. Cl. ............ 349/12; 349/106; 349/107; 349/108
(58) Field of Classification Search .................. 349/12, 349/106–108
   See application file for complete search history.

(56) References Cited

U.S. PATENT DOCUMENTS

2009/0102814 A1    4/2009    Lin et al.

FOREIGN PATENT DOCUMENTS

| JP | 05108265 | 4/1993 |
|----|----------|--------|
| JP | 2003196023 | 7/2003 |
| JP | 2006023904 | 1/2006 |
| JP | 2006189859 | 7/2006 |
| JP | 2007225875 | 9/2007 |
| JP | 2008032756 | 2/2008 |
| JP | 2010055596 | 3/2010 |
| KR | 1020070011450 | 1/2007 |
| KR | 1020070026499 | 3/2007 |
| KR | 20080061229 | 7/2008 |
| KR | 1020090059726 | 6/2009 |
| KR | 1020100031242 | 3/2010 |

*Primary Examiner* — Phu Vu
(74) *Attorney, Agent, or Firm* — H.C. Park & Associates, PLC

(57) ABSTRACT

A liquid crystal display includes a first substrate, a second substrate having a first surface and a second surface facing the first substrate, a liquid crystal layer between the first and second substrates, and a touch sensor layer on the first surface. The touch sensor layer includes a first electrode in a first direction on the first surface, a second electrode in a second direction crossing the first direction on the first surface and including first and second portions that are separated by the first electrode, a bridge wire including first and second contacts on the first surface. The first contact is electrically connected to the first portion of the second electrode, and the second contact is electrically connected to the second portion of the second electrode. An insulating layer insulates the bridge wire from the first electrode and exposes the first contact and the second contact.

31 Claims, 22 Drawing Sheets

LIQUID CRYSTAL DISPLAY INCLUDING TOUCH SENSOR LAYER AND MANUFACTURING METHOD THEREOF

CROSS REFERENCE TO RELATED APPLICATION

This application claims priority from and the benefit of Korean Patent Application No. 10-2010-0076615, filed on Aug. 9, 2010, which is hereby incorporated by reference for all purposes as if fully set forth herein.

BACKGROUND OF THE INVENTION

1. Field of the Invention

Exemplary embodiments of the present invention relate to a liquid crystal display that includes a touch sensor layer and a manufacturing method thereof.

2. Discussion of the Background

A liquid crystal display is a type of commonly used flat panel display and includes two substrates on which field generating electrodes such as a pixel electrode and a common electrode are formed with a liquid crystal layer interposed between the two substrates. The liquid crystal display displays an image by applying a voltage to the field generating electrode to generate an electric field through the liquid crystal layer. The electric field determines the direction of liquid crystal molecules of the liquid crystal layer to control the polarization and ultimately transmission of incident light. The liquid crystal display use various input devices. Many have touch panels.

Touch panel device refers to a device in which letters, figures, or tap input may be formed by contacting the external surface of the device with a finger or a stylus such as a touch pen, or a command may be performed by a machine, e.g., a computer, connected to the touch panel device by executing code in response to selection of an icon. The liquid crystal display to which the touch panel is attached determines whether fingers or the stylus contacts the screen along with contact position information, thereby displaying the corresponding image.

The touch panel may be largely classified into a resistive type, a capacitive type, and an electro-magnetic (EM) type according to the method of sensing input at the touch panel.

The capacitive type touch panel includes a film on which a transparent electrode is formed. In the capacitive type touch panel, a touch and a touch position may be recognized by applying voltage to the transparent electrode and measuring the change of the voltage caused by contact of fingers, a conductive material, and the like. In this capacitive type, the contact event and the contact position may be recognized when multiple positions are contacted simultaneously by fingers or any other conductive means.

Generally, an external touch panel attaches to the outside of the liquid crystal display, but the weight and thickness may be greater than other liquid crystal displays without a touch panel. In addition, luminance may be diminished by lowering light transmission, and the contrast ratio may be diminished by increasing external light reflectance such that the image quality of the liquid crystal display may be degraded. In addition, the cost may increase by manufacturing the touch panel separately from the liquid crystal display.

The information disclosed in this section is only for understanding of the background of the invention, and it may contain information that does not form the prior art.

SUMMARY OF THE INVENTION

Exemplary embodiments of the present invention provide a liquid crystal display that includes a touch sensor layer and a manufacturing method thereof.

Exemplary embodiments of the present invention provide a liquid crystal display that includes a touch sensor layer and a manufacturing method thereof that has a decreased thickness and weight.

Additional features of the invention will be set forth in the description which follows, and in part will be apparent from the description, or may be learned by practice of the invention.

An exemplary embodiment of the present invention discloses a liquid crystal display that comprises a first substrate; a second substrate having a first surface and a second surface facing the first substrate; a liquid crystal layer arranged between the first substrate and the second substrate; and a touch sensor layer disposed on the first surface of the second substrate. The touch sensor layer comprises a first electrode disposed on the first surface in a first direction; a second electrode disposed on the first surface in a second direction crossing the first direction and comprising a first portion and a second portion, the first portion and the second portion being separated by the first electrode; a bridge wire disposed on the first surface and comprising a first contact and a second contact, the first contact being electrically connected to the first portion of the second electrode, and the second contact being electrically connected to the second portion of the second electrode; and an insulating layer insulating the bridge wire from the first electrode.

An exemplary embodiment of the present invention also discloses a method for manufacturing a liquid crystal display. The method comprises forming a bridge wire on a first surface of a second substrate having the first surface and a second surface; forming an insulating layer that exposes a first contact and a second contact of the bridge wire; forming a first electrode in a first direction on the first surface; forming a second electrode on the first surface in a second direction that crosses the first direction, the second electrode comprising a first portion and a second portion, and the first portion and the second portion being separated by the first electrode; arranging a first substrate to face the second surface of the second substrate; and forming a liquid crystal layer between the first substrate and the second substrate. The first contact is electrically connected to the first portion of the second electrode, the second contact is electrically connected to the second portion of the second electrode, and the insulating layer insulates the bridge wire from the first electrode.

An exemplary embodiment of the present invention additionally discloses a liquid crystal display that comprises a first substrate; a second substrate having a first surface and a second surface facing the first substrate; a liquid crystal layer arranged between the first substrate and the second substrate; a touch sensor layer disposed on the first surface of the second substrate; and a conductive color filter layer disposed on the second surface of the second substrate. The conductive color filter layer is configured to receive a voltage.

An exemplary embodiment of the present invention further discloses a method for manufacturing a liquid crystal display. The method comprises forming a touch sensor layer on a first surface of a second substrate having the first surface and a second surface; forming a conductive color filter layer on the second surface of the second substrate; arranging a first substrate to face the second surface of the second substrate; and forming a liquid crystal layer between the first substrate and the second substrate.

An exemplary embodiment of the present invention discloses a liquid crystal display that comprises a first substrate; a second substrate having a first surface and a second surface facing the first substrate; a liquid crystal layer disposed between the first substrate and the second substrate; a touch sensor layer disposed on the second surface of the second substrate; and a conductive color filter layer disposed on the second surface of the second substrate. The conductive color filter layer is configured to receive a voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
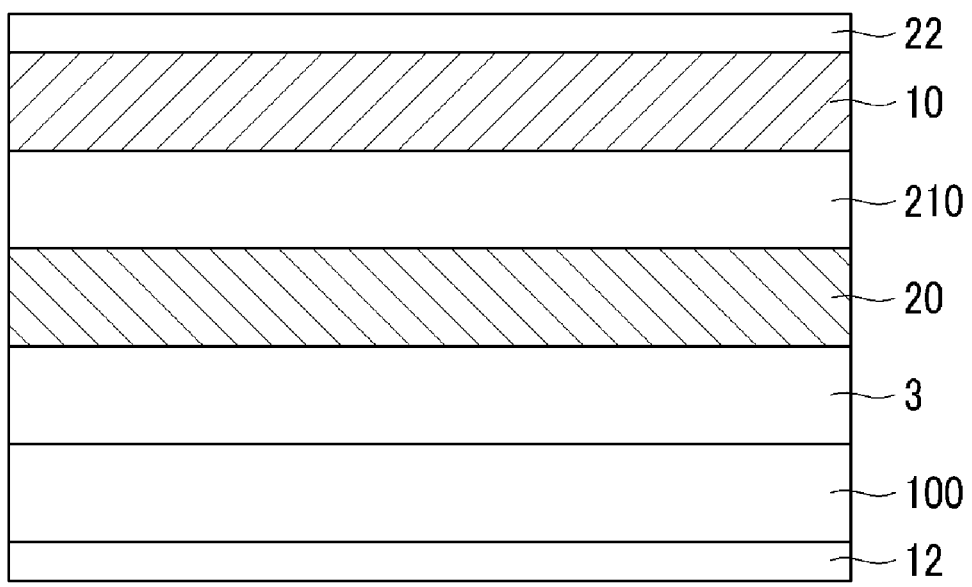
FIG. 1 is a cross-sectional view of a liquid crystal display that includes a touch sensor layer according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

FIG. 1 is a cross-sectional view of a liquid crystal display that includes a touch sensor layer according to an exemplary embodiment of the present invention.

Referring to FIG. 1, the liquid crystal display includes a lower substrate 100, an upper substrate 210, and a liquid crystal layer 3 interposed between them. The upper substrate 210 includes a first surface that does not face the lower substrate 100 and a second surface facing the lower substrate 100. Polarizers 12 and 22 are provided on external surfaces of the lower substrate 100 and the upper substrate 210. The transmissive axes of two polarizers 12 and 22 may be orthogonal to each other, and any one of the two polarizers 12 and 22 may be omitted.

A touch sensor layer 10 is formed on the first surface of the upper substrate 210, and a color filter layer 20 is formed on the second surface of the upper substrate 210. The touch sensor layer 10 is formed between the upper substrate 210 and the polarizer 22, and the color filter layer 20 is formed between the upper substrate 210 and the liquid crystal layer 3.

Figure 2:
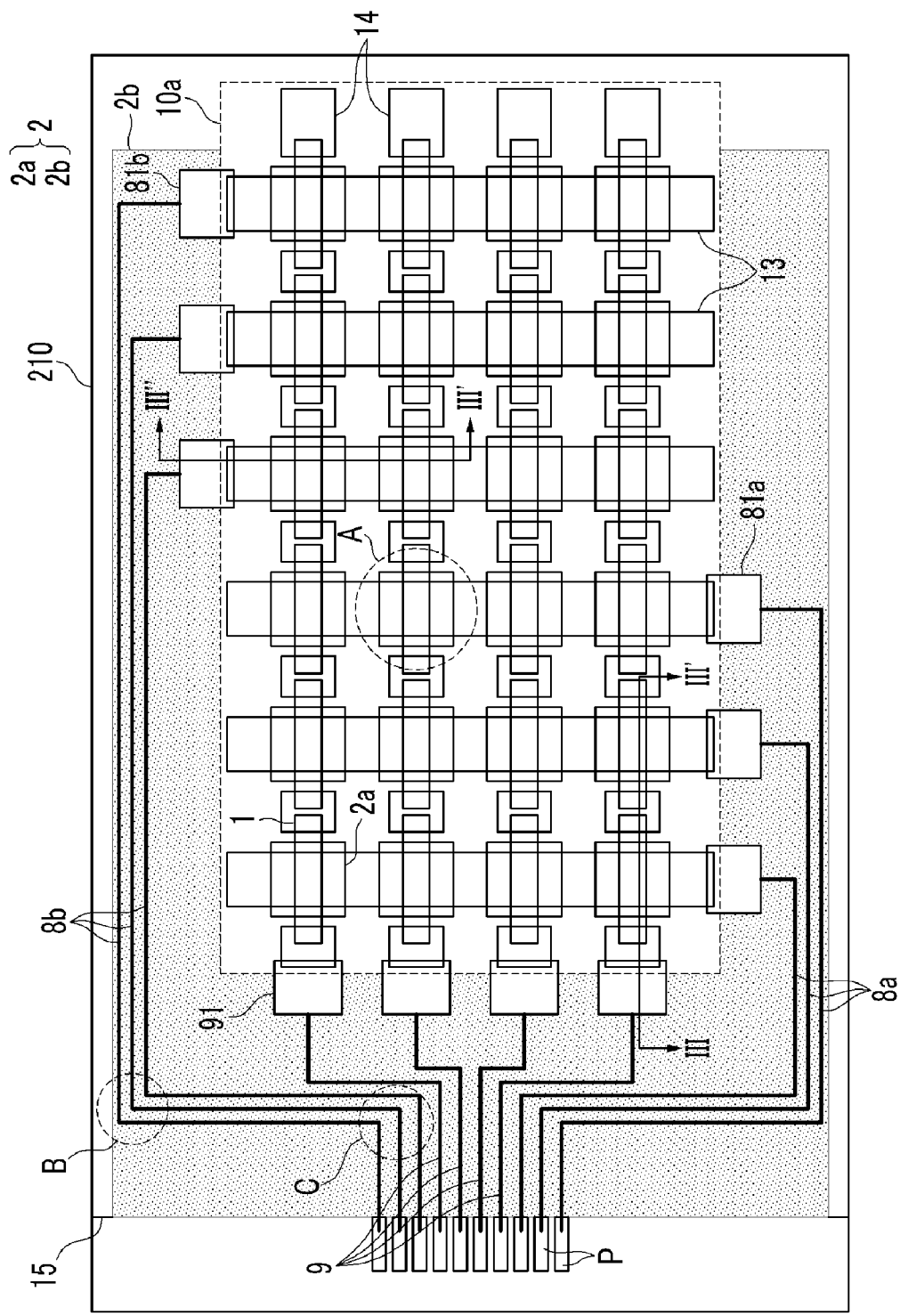
FIG. 2 is a layout view of the touch sensor layer according to the exemplary embodiment of the present invention.
Figure 3:
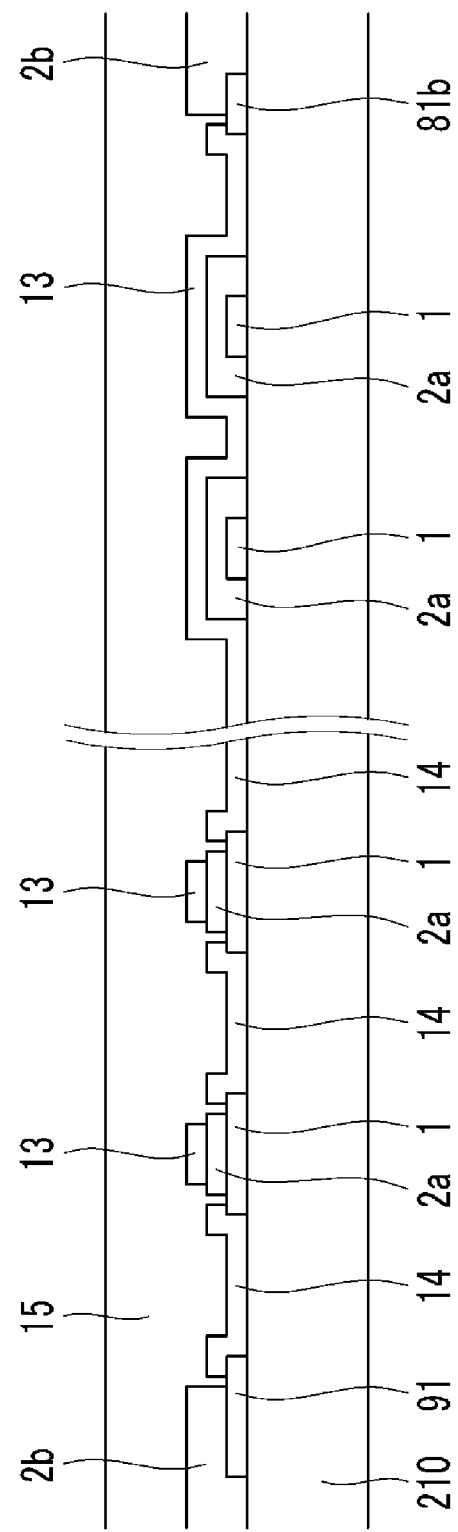
FIG. 3 is a cross-sectional view along line III-III" of FIG. 2.

FIG. 2 is a layout view of the touch sensor layer according to an exemplary embodiment of the present invention, and FIG. 3 is a cross-sectional view taken along line III-III" of FIG. 2.

Referring to FIG. 2 and FIG. 3, a plurality of bridge wires 1 and a plurality of wires 8a, 8b, and 9 are formed in a matrix form on the upper substrate 210.

The plurality of bridge wires 1 are formed in an input region 10a, and the plurality of wires 8a, 8b, and 9 are formed at the periphery of the input region 10a. The input region 10a is a region where contact position may be recognized in response to an input performed by an external contact by, e.g., a user.

Ends 81*a*, 81*b*, and 91 of the plurality of wires 8*a*, 8*b*, and 9 are positioned at the boundary of the input region 10*a*. The other ends of the plurality of wires 8*a*, 8*b*, and 9 are arranged at one side outside the input region 10*a*.

Insulating layers 2*a* and 2*b* are formed on the plurality of bridge wires 1 and the plurality of wires 8*a*, 8*b*, and 9.

The insulating layer 2*a* in the input region 10*a* is formed on the plurality of bridge wires 1 and arranged in a matrix format similar to the plurality of bridge wires 1. The length of the insulating layer 2*a* in a row direction x is shorter than the length of the bridge wire 1 in the row direction x, and the length of the insulating layer 2*a* in a column direction y is longer than the length of the bridge wire 1 in the column direction y. Therefore, the insulating layer 2*a* exposes both ends of the bridge wire 1 in the row direction x. The left and right ends of the bridge wire 1 that are exposed from the insulating layer 2*a* are referred to as a first contact portion and a second contact portion, respectively.

The insulating layer 2*b* that is formed on the plurality of wires 8*a*, 8*b*, and 9 outside the input region 10*a* insulates portions of the ends 81*a*, 81*b*, and 91 and portions of the other ends of the plurality of wires 8*a*, 8*b*, and 9.

On the upper substrate 210 in the input region 10*a*, a plurality of first electrode patterns 13 and a plurality of second electrode patterns 14 are formed. On the other ends of the plurality of wires 8*a*, 8*b*, and 9 that are exposed from the insulating layer 2*b*, a pad P is formed. Although FIG. 2 shows 6 first electrode patterns 13 and four second electrode patterns 14, the number of the first electrode patterns 13 and the number of the second electrode patterns 14 is not so limited.

The first electrode patterns 13 extend in approximately a column direction y, are parallel to each other, and are disposed over the insulating layer 2*a*. Since the length of the first electrode pattern 13 in the row direction x is shorter than the length of the insulating layer 2*a* in the row direction x, the first electrode pattern 13 does not contact the bridge wire 1. The first electrode pattern 13 extends continuously in the column direction y, i.e., there is no gap along the first electrode pattern 13.

The plurality of second electrode patterns 14 extends discontinuously in approximately a row direction x with each row of second electrode patterns 14 being parallel to each other. The second electrode pattern 14 is discontinuous pieces separated in the row direction x by the first electrode pattern 13.

The second electrode pattern 14 is disposed over the first contact portion and the second contact portion of the bridge wire 1 that are exposed from the insulating layer 2*a*. The second electrode pattern 14 does not contact the insulating layers 2*a* and 2*b*. Accordingly, the second electrode pattern 14 is separated in the row direction x on the basis of the first electrode pattern 13, but row segments of the second electrode pattern 14 electrically connect through the bridge wire 1. In other words, an electrically conductive path is established by the row segments of the second electrode pattern 14 and the corresponding bridge wires 1.

Since the first electrode pattern 13 and the second electrode pattern 14 are insulated from one another by insulating layer 2*a*, they are not electrically connected to each other.

Unlike FIG. 2, the length of the insulating layer 2*a* in the row direction x may be longer than the length of the bridge wire 1 in the row direction x, and the length of the insulating layer 2*a* in the column direction y may be shorter than the length of the bridge wire 1 in the column direction y. In this case, the insulating layer 2*a* exposes both ends in the column direction y of the bridge wire 1, the second electrode pattern 14 is continuously formed in the row direction x, and the first electrode pattern 13 is formed as separated segments in the column direction y on the basis of the second electrode pattern 14.

Referring back to FIG. 2 and FIG. 3, the first electrode pattern 13 is disposed over the portions of the ends 81*a* and 81*b* of the wires 8*a* and 8*b* that are exposed from the insulating layer 2*b*. Therefore, the plurality of first electrode patterns 13 are electrically connected to the wires 8*a* and 8*b*. The second electrode pattern 14 is disposed over the portion of the end 91 of the wire 9 that is exposed from the insulating layer 2*b*. Therefore, the plurality of second electrode patterns 14 are electrically connected to the wire 9.

On the input region 10*a* and the insulating layer 2*b*, a passivation layer 15 is formed. The passivation layer 15 exposes the pad P.

The passivation layer 15 is formed to protect the touch sensor layer while a touch sensor layer process is finished, and, thereafter, a color filter process is performed by turning over the upper substrate 210. However, as materials used to form the first electrode pattern 13, second electrode pattern 14, and the insulating layer 2, materials that are not largely damaged without the passivation layer 15 may be used. In this case, it is possible to decrease the number of masks that are required for the touch sensor layer process by omitting the mask used for the process of the passivation layer 15.

An external controller (not shown) may be connected to the pad P. The controller is connected to the first electrode pattern 13 and the second electrode pattern 14 through the pad P and the plurality of wires 8*a*, 8*b*, and 9. The controller may apply a sensing input signal to the first electrode pattern 13 and the second electrode pattern 14 or may detect a sensing output signal outputted from the first electrode pattern 13 and the second electrode pattern 14.

In the touch sensor layer that is formed as described above, the first electrode pattern 13 and the second electrode pattern 14 are electrically charged according to the sensing input signal from the controller. If contact occurs at any one portion of the input region 10*a*, capacitances of the first electrode pattern 13 and the second electrode pattern 14 are changed, and the contact position may be recognized by outputting the sensing output signal according to the changed capacitances.

FIG. 4, FIG. 5, FIG. 6, and FIG. 7 illustrate an example of a manufacturing method of the touch sensor layer of FIG. 2.

Figure 4:
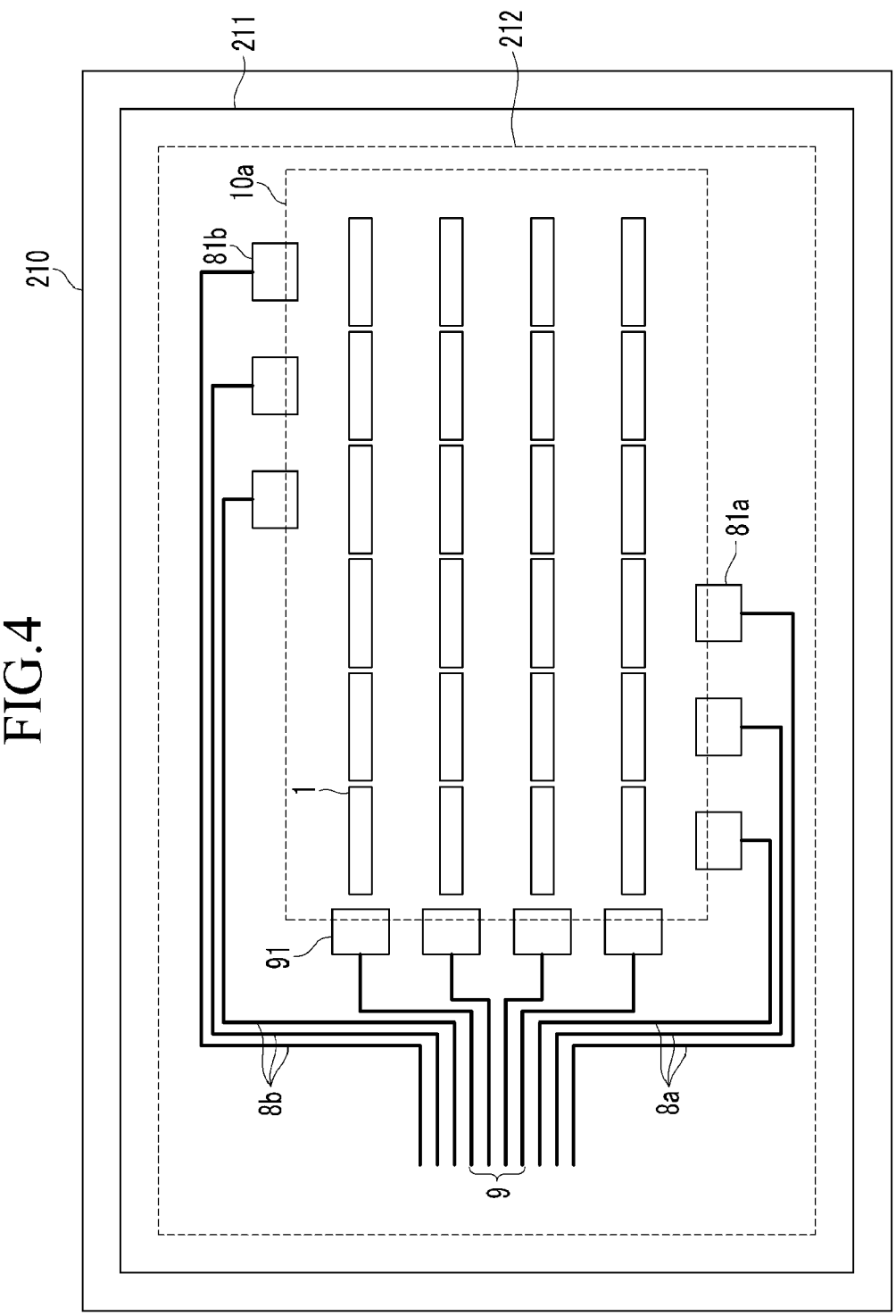
FIG. 4, FIG. 5, FIG. 6, and FIG. 7 show an example of a manufacturing method of the touch sensor layer of FIG. 2.

Referring to FIG. 4, the plurality of bridge wires 1 and the plurality of wires 8*a*, 8*b*, and 9 are formed in a matrix format on the insulation substrate 210 that may be made of glass or plastic.

A guard ring 211 may be formed around the circumference of a cut line 212. The guard ring 211 may prevent electrostatic discharge that is generated while the touch sensor layer is manufactured from flowing into elements within the guard ring 211. Therefore, the guard ring 211 may prevent a pattern that is formed within the periphery of the cut line 212 from open circuiting due to electrostatic discharge. After the manufacturing processes of the touch sensor layer are finished on the insulating substrate 210, the sensor layer process is completed by cutting along the cut line 212.

The plurality of bridge wires 1, the plurality of wires 8*a*, 8*b*, and 9, and the guard ring 211 may be made of the same material. For example, the plurality of bridge wires 1, the plurality of wires 8*a*, 8*b*, and 9 and the guard ring 211 may be made of a material that has excellent physical, chemical, and electrical contact characteristics with other layers, for example, a molybdenum-based metal, chromium, tantalum, titanium and the like. In addition, the plurality of bridge wires 1, the plurality of wires 8a, 8b, and 9 and the guard ring 211 may be made of a metal that has low resistivity to reduce voltage drop, for example, an aluminum-based metal, a silver-based metal, a copper-based metal, and the like. The thicknesses of the plurality of bridge wires 1, the plurality of wires 8a, 8b, and 9, and the guard ring 211 may be several thousand ångströms or less.

The plurality of bridge wires 1, the plurality of wires 8a, 8b, and 9, and the guard ring 211 may be formed on the substrate 210 through a photolithography process and an etching process using one mask.

Figure 5:
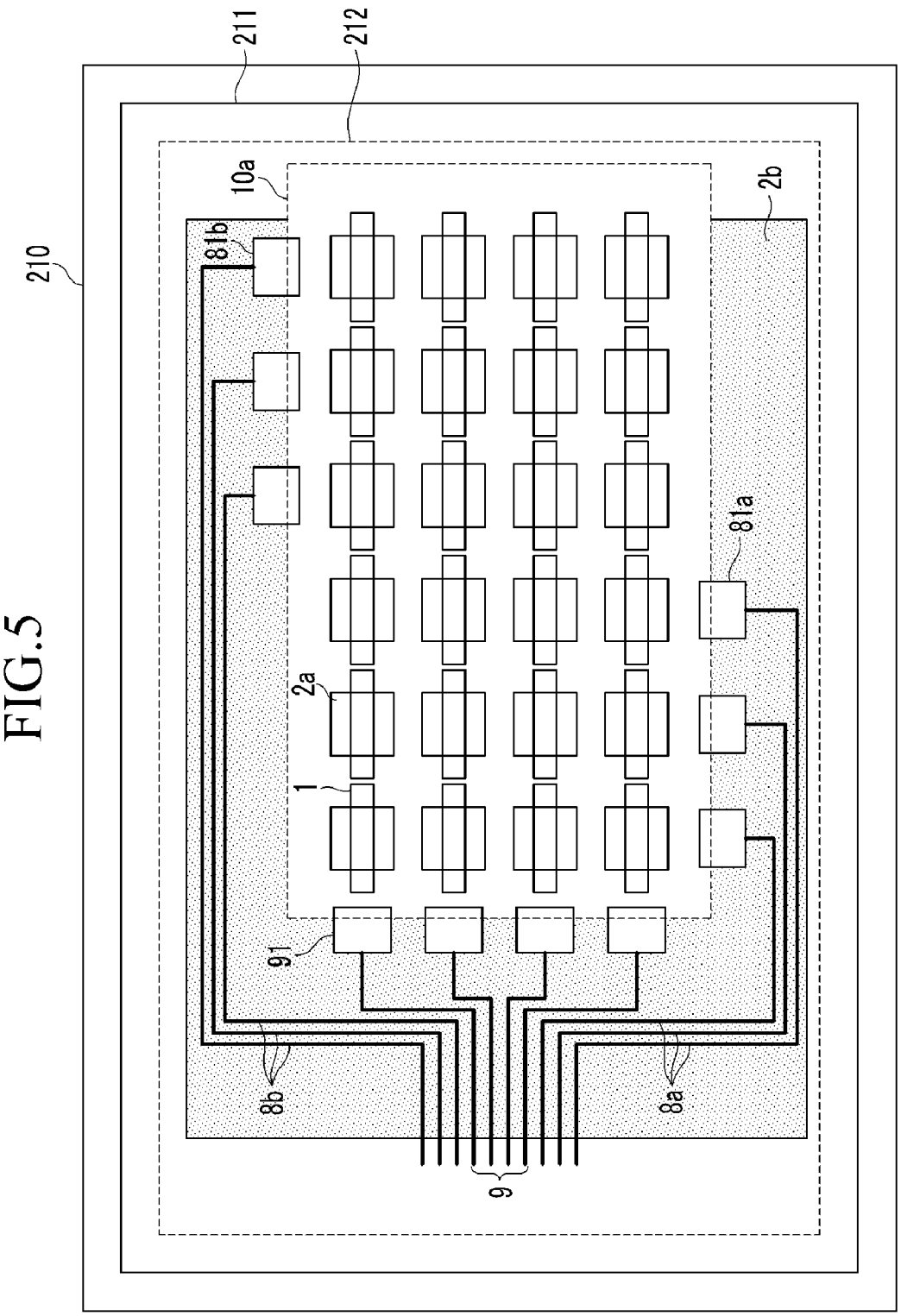

Referring to FIG. 5, the insulating layers 2a and 2b are formed on the plurality of bridge wires 1 and the plurality of wires 8a, 8b, and 9.

The insulating layers 2a and 2b may be made of a transparent inorganic insulating material such as silicon nitride (SiNx) or silicon oxide (SiOx), or an organic insulating material. In the case of when the insulating layers 2a and 2b are made of inorganic insulating material, the thicknesses of the insulating layers 2a and 2b may be several thousand angstroms or less, and in the case of when the insulating layers 2a and 2b are made of organic insulating material, the thicknesses of the insulating layers 2a and 2b may be several micrometers or less. The insulating layers 2a and 2b may be formed through a photolithography process and an etching process using one mask.

Figure 6:
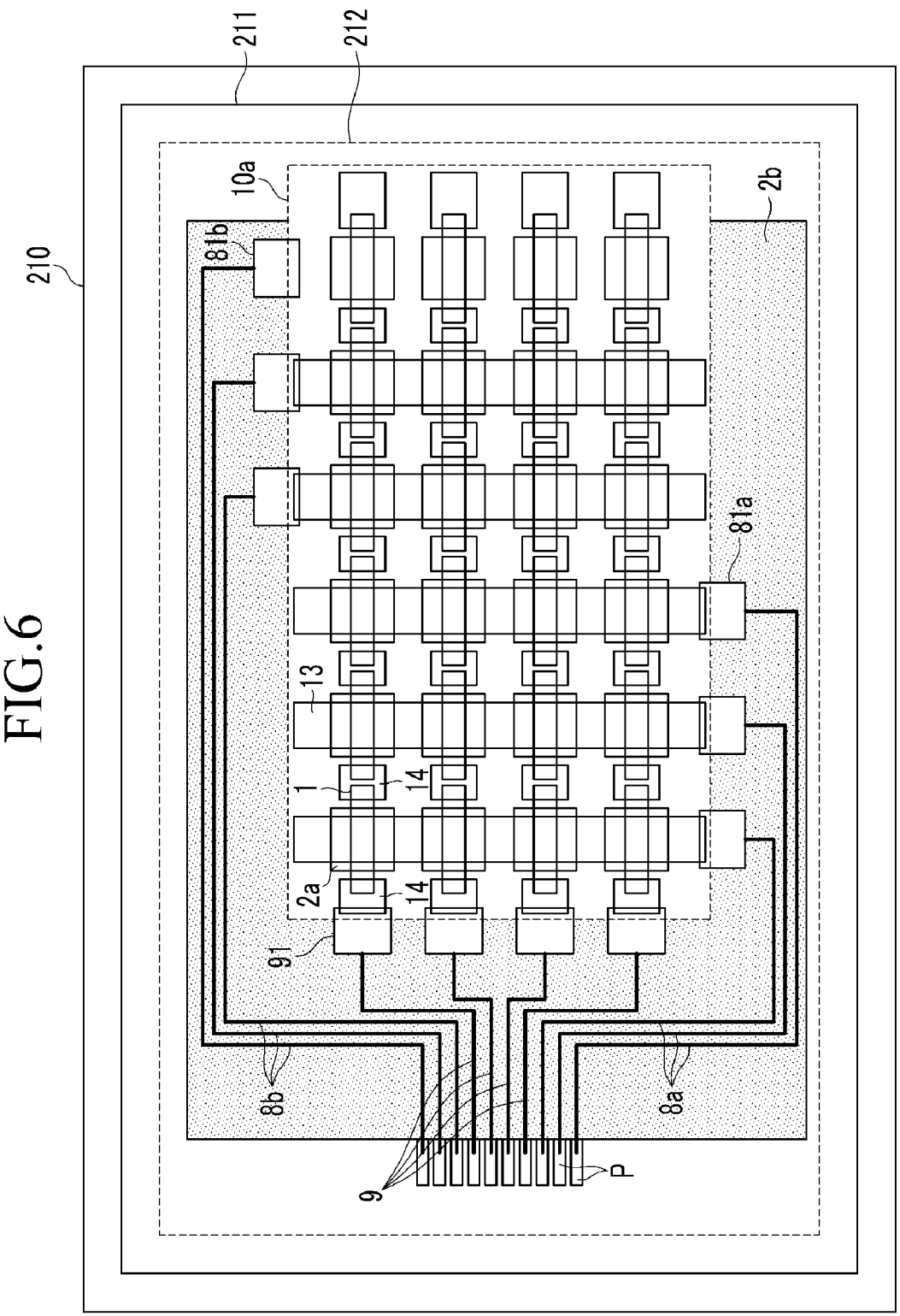

Referring to FIG. 6, in the input region 10a, the plurality of first electrode patterns 13 and the plurality of second electrode patterns 14 are formed, and on the other ends of the plurality of wires 8a, 8b, and 9 that are exposed from the insulating layer 2b, the pad P is formed.

The first electrode pattern 13, the second electrode pattern 14, and the pad P may be made of a transparent conductive material such as indium tin oxide (ITO) or indium zinc oxide (IZO). The thicknesses of the first electrode pattern 13, the second electrode pattern 14, and the pad P may be several thousand angstroms or less. The first electrode pattern 13, the second electrode pattern 14 and the pad P may be formed through the photolithography process and etching process using one mask.

Figure 7:
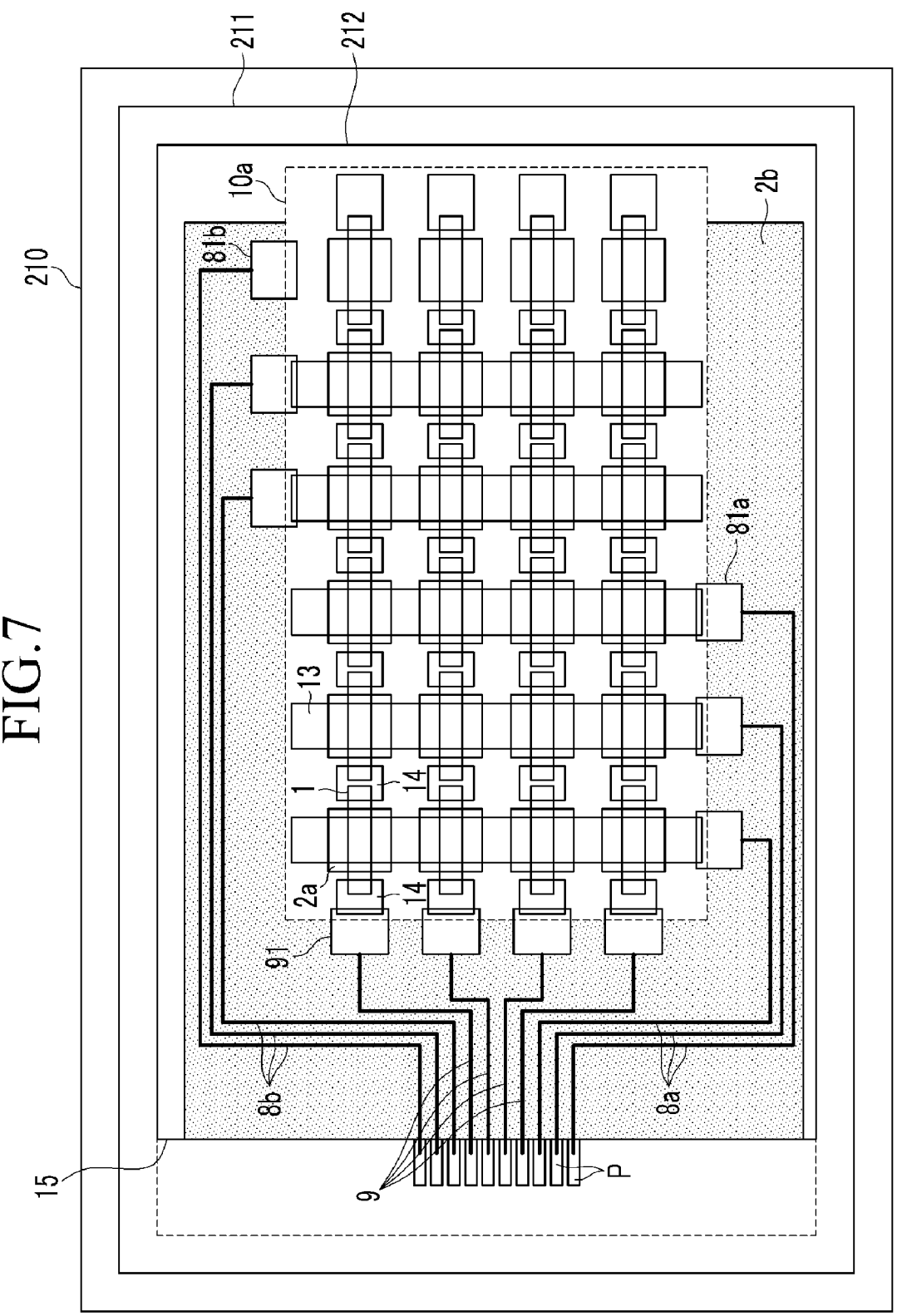

Referring to FIG. 7, on the input region 10a and the insulating layer 2b, the passivation layer 15 is formed. The passivation layer 15 exposes the pad P. The passivation layer 15 may be made of the transparent inorganic insulating material, e.g., silicon nitride (SiNx) or silicon oxide (SiOx), or organic insulating material. When the passivation layer 15 is made of the inorganic insulating material, the thickness of the passivation layer 15 may be several thousand angstroms or less. When the passivation layer 15 is made of organic insulating material, the thickness of the passivation layer 15 may be several micrometers or less. The passivation layer 15 may be formed through a photolithography process and an etching process using one mask. However, the passivation layer 15 may be omitted if necessary.

After the processes of FIG. 4, FIG. 5, FIG. 6, and FIG. 7 are completed, the touch sensor layer on the substrate is completed as shown in FIG. 2 by cutting along the cut line 212.

Figure 8:
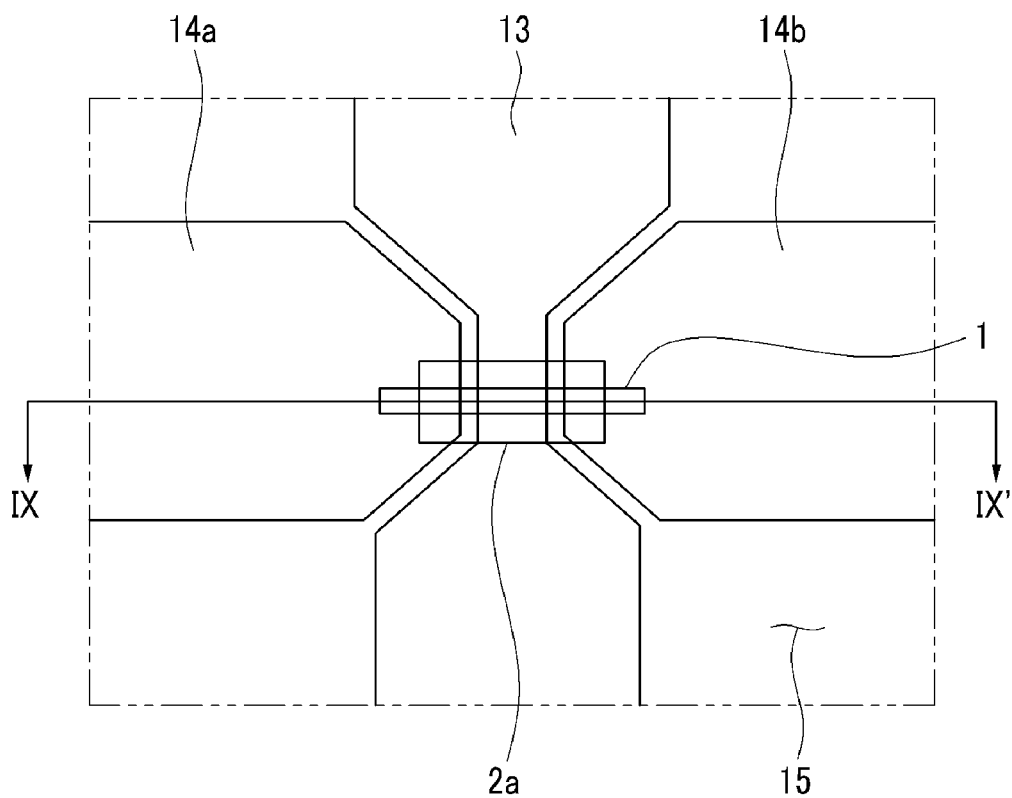
FIG. 8 shows an enlarged layout view of region A of FIG. 2.
Figure 9:
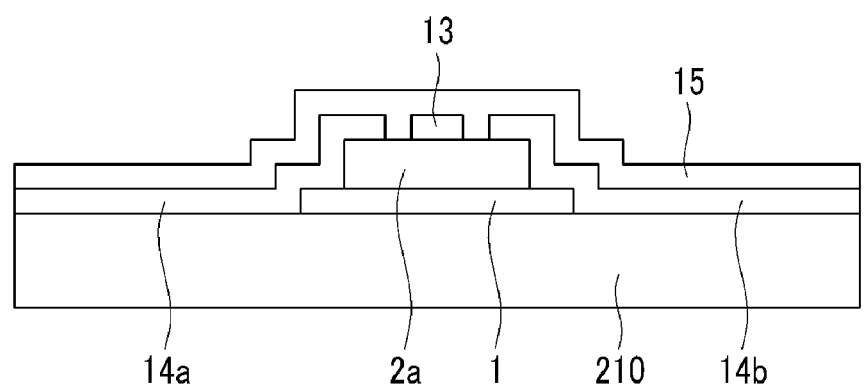
FIG. 9 is a cross-sectional view taken along line IX-IX' of FIG. 8.

FIG. 8 shows an enlarged layout view of region A of FIG. 2. FIG. 9 is a cross-sectional view taken along line IX-IX' of FIG. 8.

FIG. 8 and FIG. 9 are substantially similar to FIG. 2 with the exception of the shapes of the first electrode pattern 13 and the second electrode patterns 14a and 14b. Therefore, FIG. 8 and FIG. 9 may be formed by using the processes of FIG. 4, FIG. 5, FIG. 6, and FIG. 7.

As shown in FIG. 8, the bridge wire 1 is formed on the insulation substrate 210 and the insulating layer 2a is formed on the bridge wire 1. The length of the insulating layer 2a in the row direction x is shorter than the length of the bridge wire 1 in the row direction x, and the length of the insulating layer 2a in the column direction y is longer than the length of the bridge wire 1 in the column direction y. Therefore, the insulating layer 2a exposes both ends in the row direction x of the bridge wire 1. The both ends of the bridge wire 1 that are exposed from the insulating layer 2a are referred to as the first contact portion and the second contact portion, respectively.

The first electrode pattern 13 is formed in the column direction y, and a portion of the first electrode pattern 13 is disposed on the insulating layer 2a. The second electrode patterns 14a and 14b are formed in a row direction x. The second electrode pattern 14 includes the first portion 14a and the second portion 14b that are separated by the first electrode pattern 13.

Unlike FIG. 2, the first electrode pattern 13 has a width in a row direction x that becomes narrow at the portion over the insulating layer 2a. The second electrode patterns 14a and 14b extend into a portion of the space that is formed by the narrowed width of the first electrode pattern 13. The second electrode patterns 14a and 14b do not contact and are electrically insulated from the first electrode pattern 13, and the second electrode patterns 14a and 14b are not electrically connected to each other except by the bridge wire 1.

The second electrode patterns 14a and 14b extend to completely cover the first contact portion and the second contact portion of the bridge wire 1. Since the second electrode patterns 14a and 14b may increase the contact area between the first contact portion and the second contact portion, the electrical connection between the first portion 14a and the second portion 14b may be increased.

The passivation layer 15 is formed on the first electrode pattern 13 and the second electrode patterns 14a and 14b. However, the passivation layer 15 may be omitted.

Figure 10:
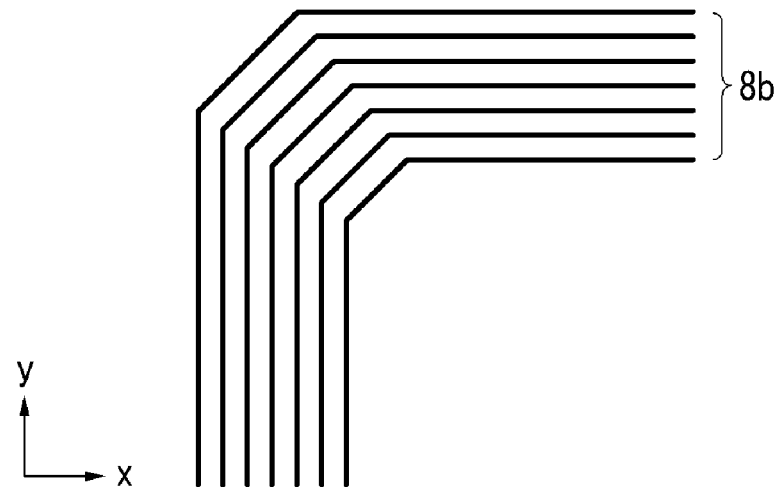
FIG. 10 shows an enlarged layout view of region B of FIG. 2.
Figure 11:
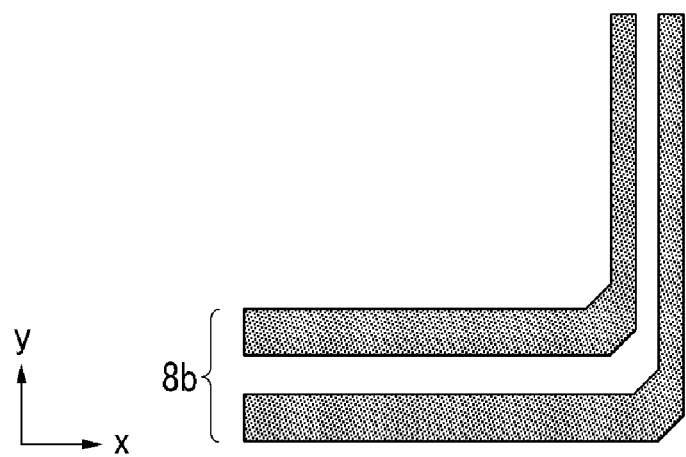
FIG. 11 shows an enlarged layout view of region C of FIG. 2.

FIG. 10 shows an enlarged layout view of region B of FIG. 2. FIG. 11 shows an enlarged layout view of region C of FIG. 2.

Referring to FIG. 10 and FIG. 11, the formation direction of the wire 8b is changed from the row direction x to the column direction y. A portion where the direction of the wires 8b transitions from the row direction x to the column direction y may be formed as a diagonal or curved line. As described above, electrostatic discharge and open circuiting may be prevented by using a diagonal or curved line where the formation direction of the wire 8b changes direction. FIG. 10 and FIG. 11 show only region B and region C in FIG. 2, and portions at which the directions of the wires 8a, 8b, and 9 change may use a diagonal or curved line in a continuous fashion.

Figure 12:
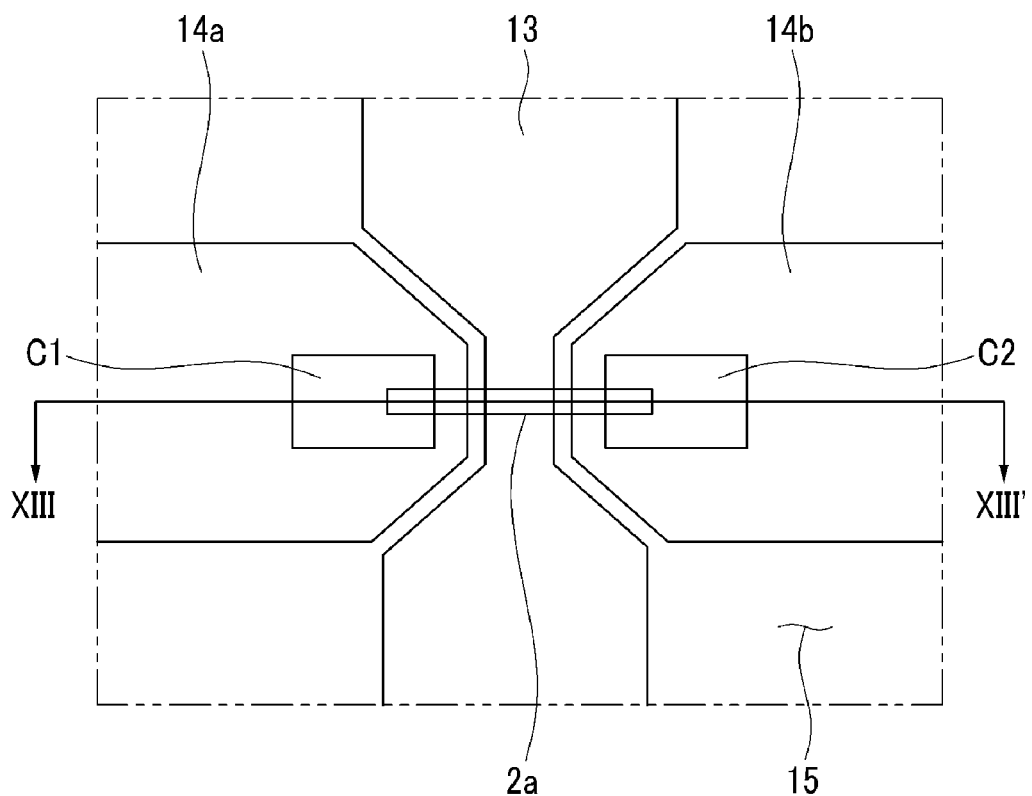
FIG. 12 is a layout view showing a first electrode pattern and a second electrode pattern in a touch sensor layer according to another exemplary embodiment of the present invention.
Figure 13:
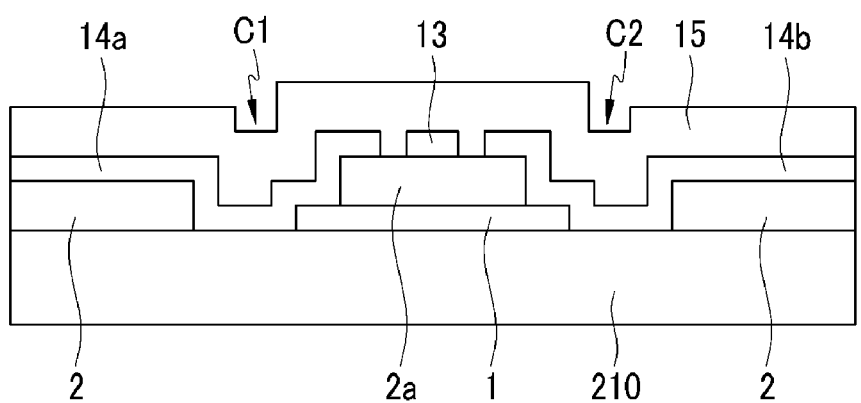
FIG. 13 is a cross-sectional view taken along line XIII-XIII' of FIG. 12.

FIG. 12 is a layout view showing the first electrode pattern and the second electrode pattern in the touch sensor layer according to another exemplary embodiment of the present invention, and FIG. 13 is a cross-sectional view taken along line XIII-XIII' of FIG. 12.

Referring to FIG. 12 and FIG. 13, the bridge wire 1 is formed on the substrate 210. The insulating layer 2 is formed on the bridge wire 1 and the substrate 210. The insulating layer 2 has contact holes C1 and C2 exposing both ends of the bridge wire 1 in the row direction x. Both ends of the bridge wire 1 that are exposed through the contact holes C1 and C2 are referred to as the first contact portion and the second contact portion.

The first electrode pattern 13 and the second electrode patterns 14a and 14b are formed on the insulating layers 2. The first electrode pattern 13 has a width that becomes narrow in the row direction x at the portion over the bridge wire 1. However, since the insulating layer 2 is formed between the first electrode pattern 13 and the bridge wire 1, the first electrode pattern 13 is not connected to the bridge wire 1.

The second electrode patterns 14a and 14b are disposed over the contact holes C1 and C2 and extend into a portion of the space that is formed by the narrowed width of the first electrode pattern 13. Since the first electrode pattern 13 and the second electrode patterns 14a and 14b do not contact each other, they are not electrically connected to each other. The first portion 14a of the second electrode pattern is disposed over the first contact portion of the bridge wire 1 through the contact hole C1, and the second portion 14b is disposed over the second contact portion of the bridge wire 1 through the contact hole C2. Therefore, the first portion 14a and the second portion 14b of the second electrode pattern are separated from each other on the basis of the first electrode pattern 13 but are electrically connected to each other through the first contact portion and the second contact portion of the bridge wire 1.

The passivation layer 15 is formed on the first electrode pattern 13, the second electrode pattern 14, and the exposed portions of the insulating layer 2. However, the passivation layer 15 may be omitted.

Unlike the insulating layer 2a that is formed on only the bridge wire 1 in FIG. 9, the insulating layer 2 of FIG. 13 is formed on the entire substrate 210 and has the contact holes C1 and C2 exposing the first contact portion and the second contact portion of the bridge wire 1. The formation of the insulating layer 2 of FIG. 12 may reduce the etching area and the etching time as compared to the formation of the insulating layer 2a of FIG. 9. In addition, it is possible to improve etching uniformity and to prevent a short circuit of the first electrode pattern 13 and the second electrode pattern 14 that are insulated from each other.

Figure 14:
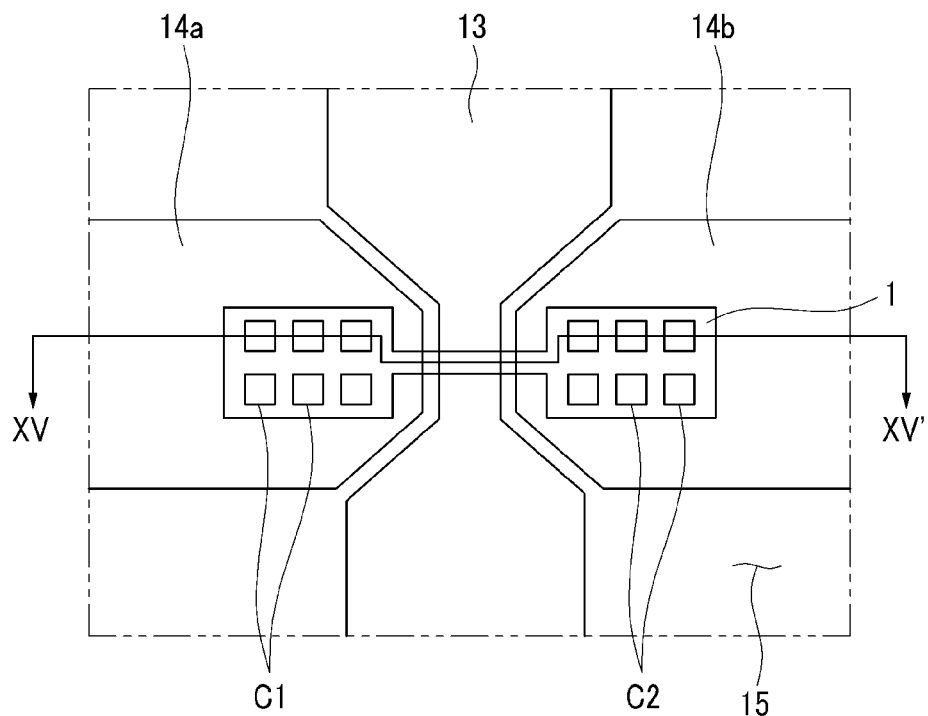
FIG. 14 is a layout view showing a first electrode pattern and a second electrode pattern in a touch sensor layer according to another exemplary embodiment of the present invention.
Figure 15:
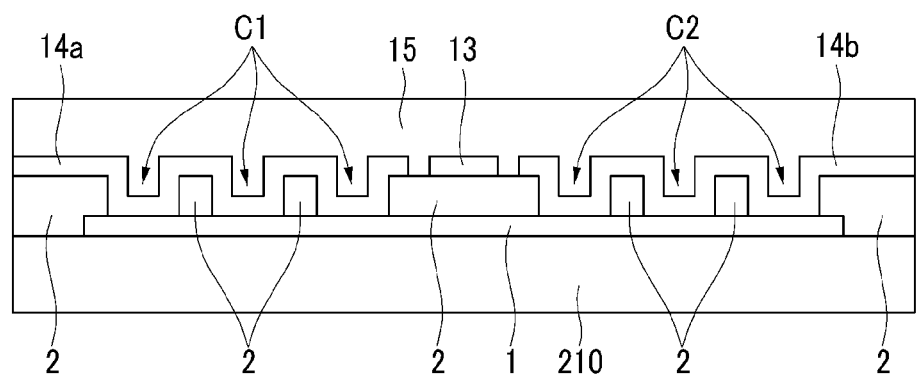
FIG. 15 is a cross-sectional view taken along line XV-XV' of FIG. 14.

FIG. 14 is a layout view showing a first electrode pattern and a second electrode pattern in a touch sensor layer according to another embodiment of the present invention, and FIG. 15 is a cross-sectional view taken along line XV-XV' of FIG. 14.

FIG. 14 and FIG. 15 are substantially similar to FIG. 12 and FIG. 13 except that both ends of the bridge wire 1 extend in the row direction x, and the insulating layer 2 has a plurality of contact holes C1 and C2.

The bridge wire 1 is formed on the substrate 210, and both ends of the bridge wire 1 extend in the row direction x. The extended portions of the bridge wire 1 are referred to as the first contact portion and the second contact portion.

The insulating layer 2 is formed on the bridge wire 1 and the substrate 210. The insulating layer 2 has a plurality of contact holes C1 and C2 exposing the first contact portion and the second contact portion of the bridge wire 1. In the drawing, the insulating layer 2 has 12 contact holes C1 and C2, but the number of contact holes in the insulating layer 2 is not so limited.

The first electrode pattern 13 and the second electrode patterns 14a and 14b are formed on the insulating layer 2. The first portion 14a of the second electrode pattern is disposed over the first contact portion of the bridge wire 1 through the plurality of contact holes C1, and the second portion 14b is disposed over the second contact portion of the bridge wire 1 through the plurality of contact holes C2. Therefore, the first portion 14a and the second portion 14b of the second electrode pattern are separated from each other by the first electrode pattern 13, but they are electrically connected to each other through the first contact portion and the second contact portion of the bridge wire 1.

The passivation layer 15 is formed on the first electrode pattern 13, the second electrode pattern 14, and exposed portions of the insulating layer 2. However, the passivation layer 15 may be omitted.

Since the second electrode patterns 14a and 14b are connected to the first contact portion and the second contact portion of the bridge wire 1 through the plurality of contact holes C1 and C2, the contact area between the second electrode patterns 14a and 14b and the bridge wire 1 may be increased. This structure may prevent open circuiting and corrosion of the bridge wire 1 by moisture permeation.

The touch sensor layer 10 that is formed on the first surface of the upper substrate 210, i.e., the surface that does not face the lower substrate 100, is described above. If the formation of the touch sensor layer 10 occurs on the first surface of the upper substrate 210, the upper substrate 210 is turned over, and the color filter layer 20 is formed on the second surface of the upper substrate 210. If necessary, after the color filter layer 20 is first formed on the second surface of the upper substrate 210, the touch sensor layer 10 may be formed on the first surface.

If the touch sensor layer 10 and the color filter layer 20 are formed on the first surface and the second surface of the upper substrate 210, respectively, the liquid crystal display shown in FIG. 1 is completed by bonding the upper substrate 210 with the lower substrate 100 while injecting liquid crystals therebetween and attaching the polarizers 22 and 12.

Now, the liquid crystal display is described with reference to FIG. 16 and FIG. 17.

Figure 16:
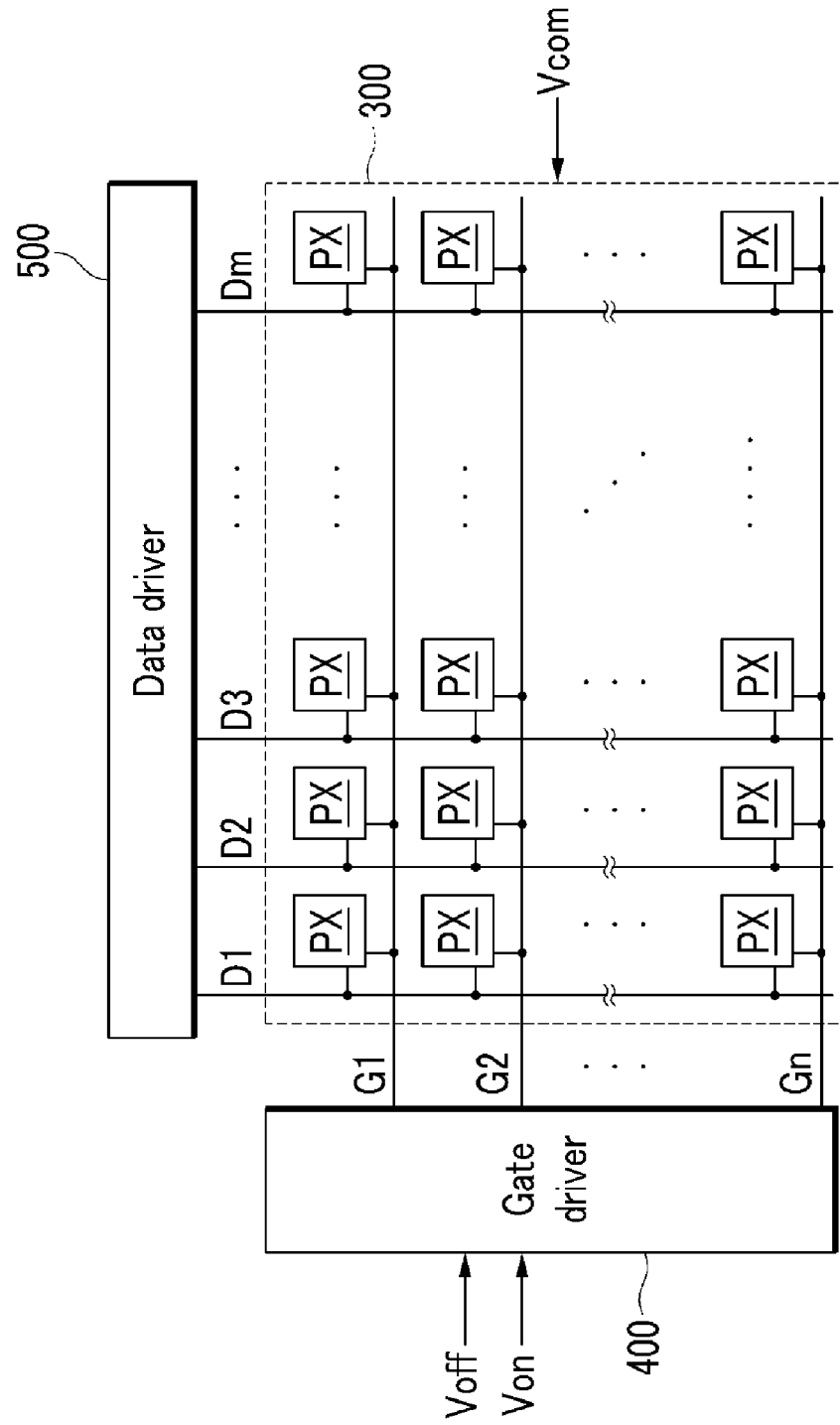
FIG. 16 is a block diagram of a liquid crystal display according to an exemplary embodiment of the present invention.
Figure 17:
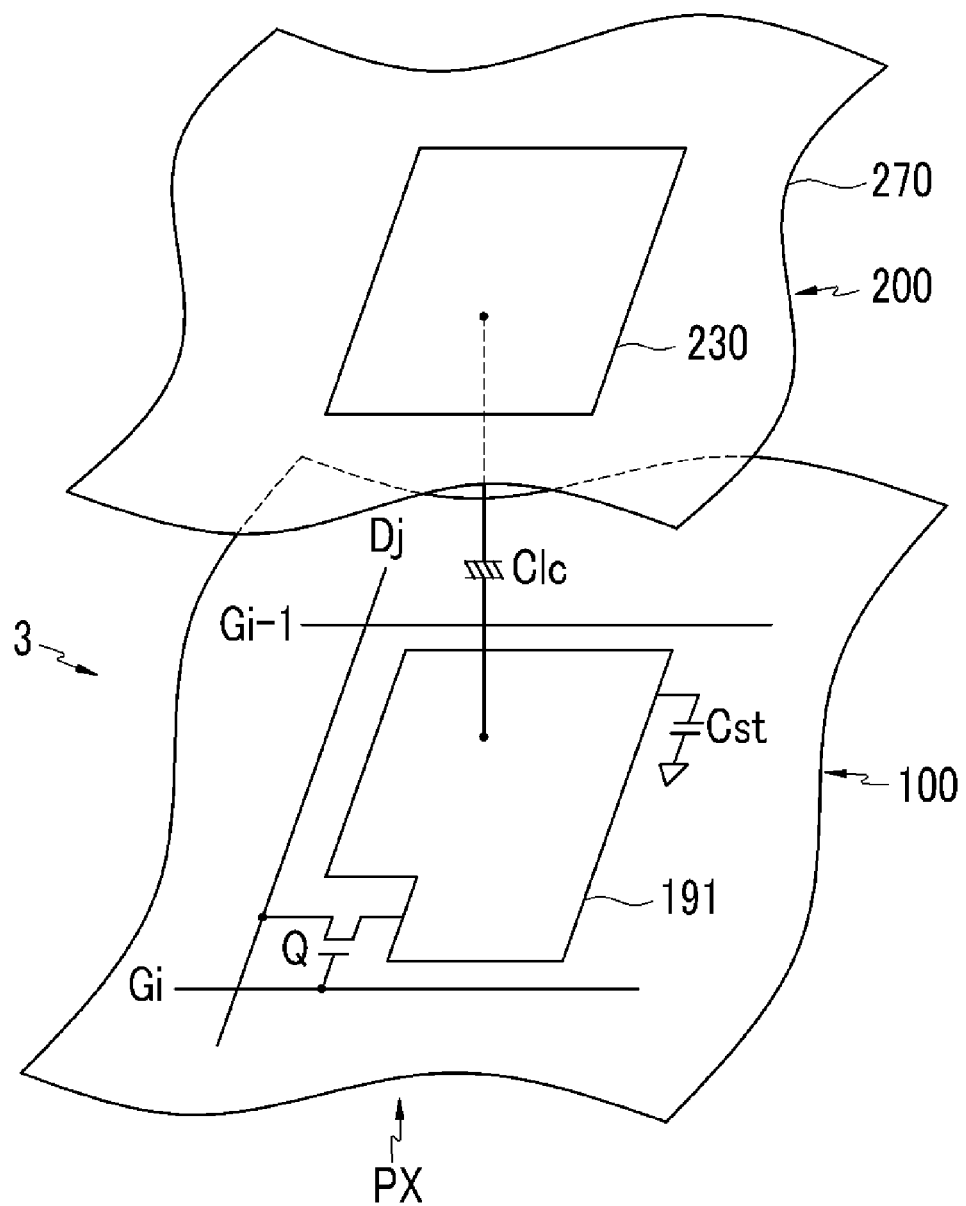
FIG. 17 is an equivalent circuit diagram of a pixel of the liquid crystal display according to an exemplary embodiment of the present invention.

FIG. 16 is a block diagram of a liquid crystal display according to an exemplary embodiment of the present invention, and FIG. 17 is an equivalent circuit diagram of a pixel of a liquid crystal display according to an exemplary embodiment of the present invention.

Referring to FIG. 16, the liquid crystal display according to the exemplary embodiment of the present invention includes a liquid crystal panel assembly 300, a gate driver 400, and a data driver 500.

The liquid crystal panel assembly 300, when it is viewed in the equivalent circuit, includes a plurality of signal lines G1-Gn, D1-Dm and a plurality of pixels PX that are connected thereto and arranged in approximately a matrix format. On the other hand, with reference to the structure shown in FIG. 17, the liquid crystal panel assembly 300 includes lower and upper substrates 100 and 200 that face each other and a liquid crystal layer 3 that is interposed therebetween. A touch sensor layer and a color filter layer are formed on the upper substrate 200.

The signal lines G1-Gn, D1-Dm are provided in the lower substrate 100. A plurality of gate lines G1-Gn transfers gate signals (referred to as "scanning signals"), and a plurality of data lines D1-Dm transfers data voltages.

A pixel PX is connected to the i-th (i=1, 2, . . . , n) gate line Gi and j-th (j=1, 2, . . . , m) data line Dj and includes a switching element Q that is connected to the signal lines Gi, Dj, and a liquid crystal capacitor Clc and a storage capacitor Cst are connected thereto. The storage capacitor Cst may be omitted if necessary.

The switching element Q is a three-terminal element such as a thin film transistor that is provided in the lower substrate 100, and a control terminal thereof is connected to the gate line Gi; an input terminal is connected to the data line Dj, and an output terminal is connected to the liquid crystal capacitor Clc and storage capacitor Cst.

The liquid crystal capacitor Clc includes, as its two terminals, a pixel electrode 191 of the lower substrate 100 and an opposed electrode 270 that is formed as a plate over the plurality of pixels PX on the upper substrate 200. The liquid crystal layer 3 serves as a dielectric between the pixel electrode 191 and the opposed electrode 270.

The storage capacitor Cst, which performs an auxiliary role as part of the liquid crystal capacitor Clc, is configured by overlapping an additional signal line (not shown) and the pixel electrode 191 (both provided on the lower substrate 100) with an insulator interposed therebetween. A voltage, e.g., a common voltage Vcom, may be applied to the additional signal line. However, the storage capacitor Cst may be configured by overlapping the pixel electrode 191 and a previous gate line Gi−1 with the insulator interposed therebetween.

To implement a color display, a color is displayed by using the spatial and temporal sum of primary colors as displayed by each pixel PX (spatial division) or alternately displaying the primary colors according to the time displayed by each pixel PX (temporal division). Examples of primary colors may include red, green, and blue. FIG. 17 is an example of spatial division and illustrates that each pixel PX includes the color filter 230 that displays one of the primary colors in the region of the upper substrate 200 corresponding to the pixel electrode 191. Unlike FIG. 17, the color filter 230 may be disposed above or below the pixel electrode 191 of the lower substrate 100.

At least one polarizer (not shown) may be provided in the liquid crystal panel assembly 300.

Referring back to FIG. 16, the data driver 500 is connected to the data lines D1-Dm of the liquid crystal panel assembly 300 and applies a data voltage to the data lines D1-Dm.

The gate driver 400 is connected to the gate lines G1-Gn of the liquid crystal panel assembly 300 and applies a gate signal to the gate lines G1-Gn. The gate signal may apply a gate-on voltage Von to turn on the switching element Q and a gate-off voltage Voff to turn off the switching element Q.

However, in the case of when the upper substrate 200 is formed in conjunction with the touch sensor layer 10 and color filter layer 20, the touch sensor layer 10 is closer to the color filter layer 20 and the lower substrate 100 and is affected by various signals that are generated from the color filter layer 20 and the lower substrate 100. The touch sensor layer 10 senses a contact position by the change in capacitance in response to the occurrence of a contact. Since the change in the capacitance is small, detection of the capacitive change is sensitive to noise. The signals that are generated from the color filter layer 20 and the lower substrate 100 may be sources of noise and EMI (electromagnetic interference) affecting the touch sensor layer 10. Therefore, a method that may lower the noise affecting the touch sensor layer 10 might be beneficial.

A color filter layer that may mitigate the noise affecting the touch sensor layer is described below.

Figure 18:
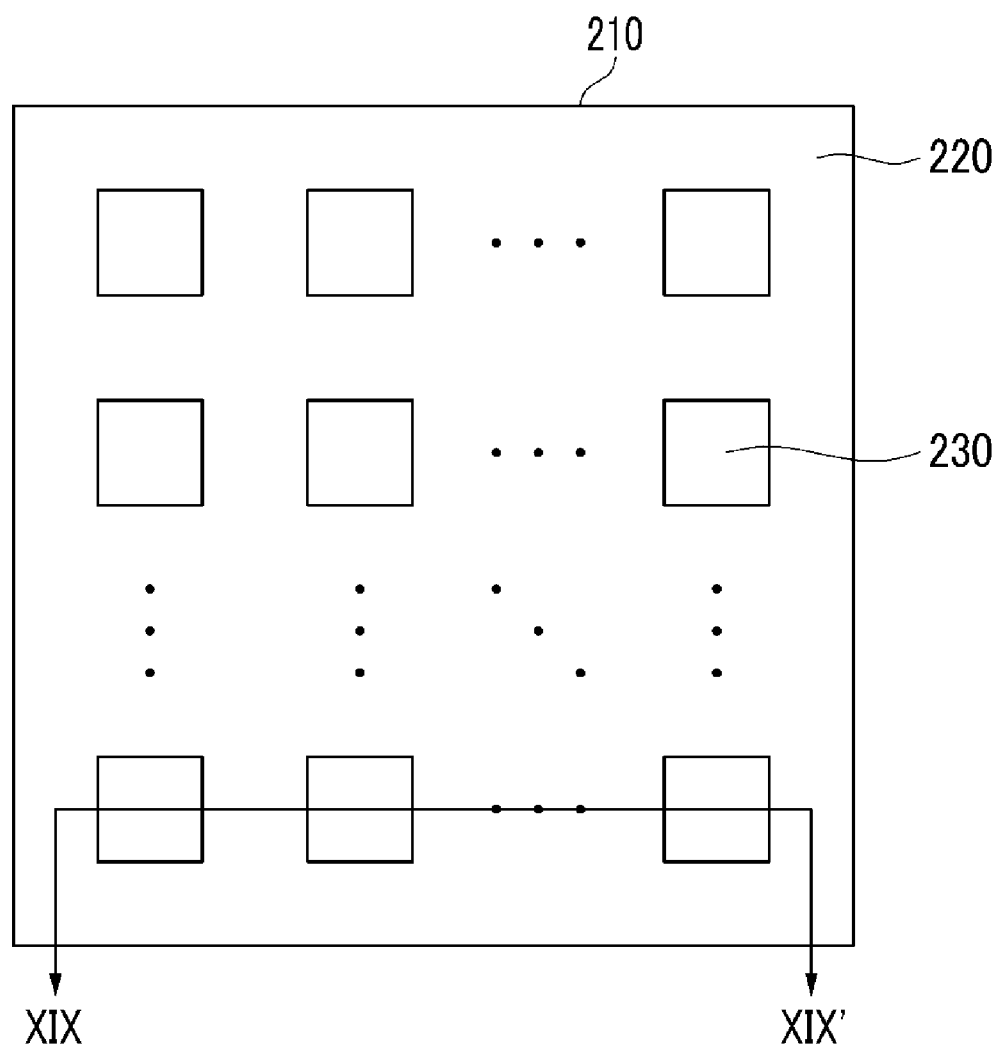
FIG. 18 is a layout view of a color filter layer according to an exemplary embodiment of the present invention.
Figure 19:
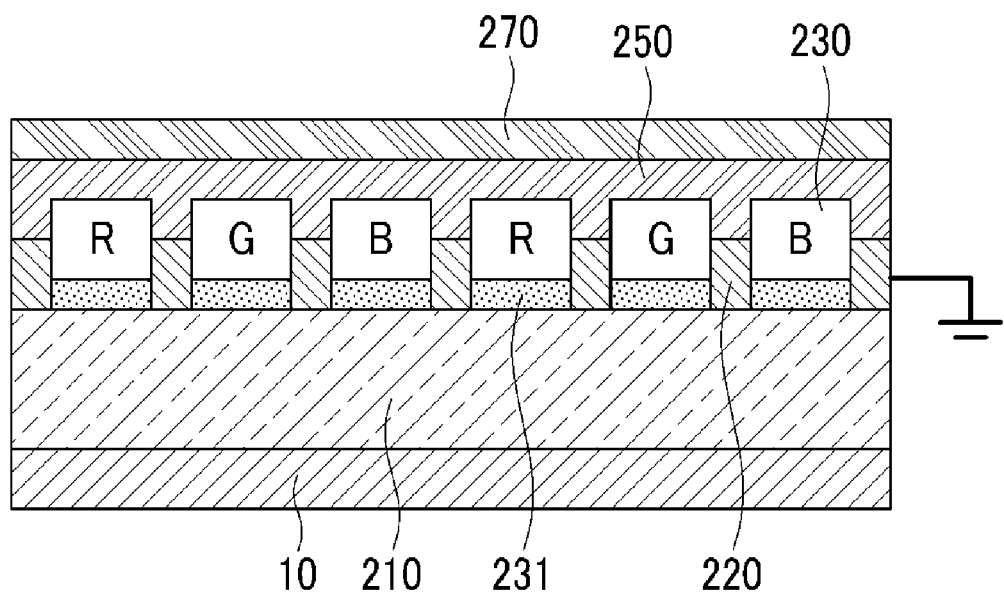
FIG. 19 is a cross-sectional view taken along line XIX-XIX' of FIG. 18.

FIG. 18 is a layout view of a color filter layer according to an exemplary embodiment of the present invention, and FIG. 19 is a cross-sectional view taken along line XIX-XIX' of FIG. 18.

Referring to FIG. 18 and FIG. 19, the touch sensor layer 10 is formed on the first surface of the substrate 210, and a color filter layer that includes a conductive light blocking member 220, a conductive particle 231, a color filter 230, an overcoat 250, and an opposed electrode 270 is formed on the second surface of the substrate 210.

The conductive light blocking member 220 is formed on the substrate 210. The conductive light blocking member 220 is referred to as a black matrix and prevents light leakage between the pixel electrodes 191 (see FIG. 17). The conductive light blocking member 220 has a plurality of openings that face the pixel electrodes 191 (see FIG. 17) that have almost the same shape as the pixel electrodes 191 (see FIG. 17).

The conductive particle 231 is formed in an opening of the conductive light blocking member 220 on the substrate 210. A plurality of color filters 230 are also formed on the conductive particle 231 and disposed in a region that is surrounded by the conductive light blocking member 220. The color filter 230 extends in a vertical direction to form a stripe, facing the corresponding pixel electrode 191 (see FIG. 17). Each color filter 230 may display one of three primary colors of red, green, and blue.

On the color filter 230 and the conductive light blocking member 220, the overcoat 250 is formed. The overcoat 250 protects the color filter 230, prevents the color filter 230 from being exposed, and provides a flat (planarizing) surface.

The opposed electrode 270 is formed on the overcoat 250. The common voltage Vcom is applied to the opposed electrode 270.

The conductive light blocking member 220 and conductive particle 231 form a conductive shielding layer. The conductive shielding layer may be grounded or biased with a voltage. The conductive shielding layer prevents the signals that are generated from the color filter layer and the lower substrate 100 from affecting the touch sensor layer 10 as noise. In addition, the conductive shielding layer is established by only the conductive light blocking member 220 and the conductive particle 231 that are disposed using a process similar to the process discussed above for forming a color filter layer. Therefore, forming an additional conductive shielding layer is not needed. Since it is unnecessary to form an additional conductive shielding layer, the thickness of the liquid crystal display does not increase.

FIG. 20, FIG. 21, FIG. 22, and FIG. 23 show an exemplary embodiment of a manufacturing method of the color filter layer of FIG. 19.

Figure 20:
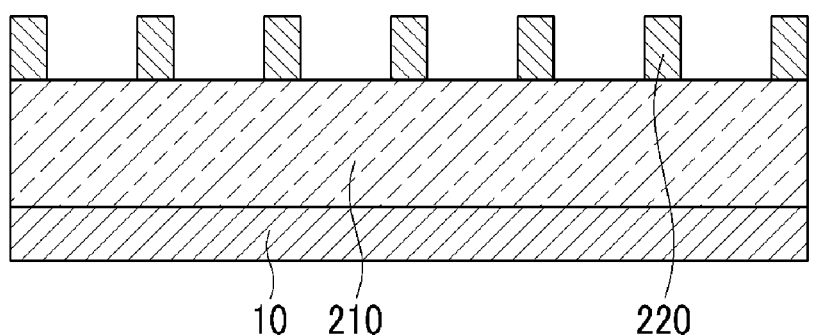
FIG. 20, FIG. 21, FIG. 22, and FIG. 23 show an exemplary embodiment of a manufacturing method of the color filter layer of FIG. 19.

Referring to FIG. 20, when the touch sensor layer 10 is formed on the first surface of the substrate 210, the conductive light blocking member 220 is formed on the second surface of the substrate 210 by turning the substrate 210 over. The conductive light blocking member 220 may be made from a chromium single film, double films of chromium and chromium oxide, or an organic material that may include a metallic thin film and a black pigment.

Figure 21:
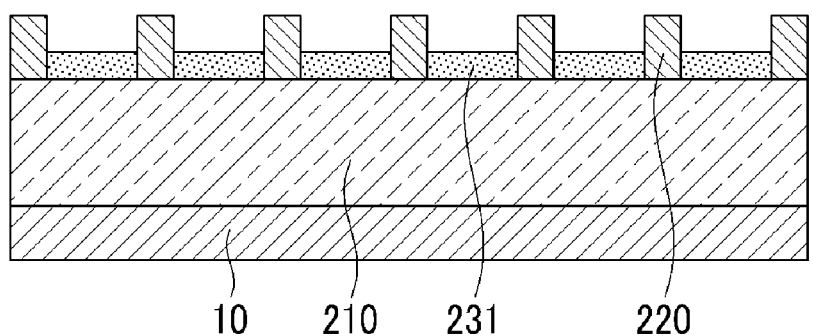

Referring to FIG. 21, the conductive particle 231 is formed in an opening of the conductive light blocking member 220 on the substrate 210. The conductive particle 231 may include a transparent conductive particle, which has a size ranging 200 nm or less, such as ITO, IZO, and fluorine doped tin oxide (FTO). More preferably, the transparent conductive particle has a size raging from 5 nm to 70 nm. The conductive particle 231 may be formed by coating a solution that includes the conductive particles using an inkjet method and curing the coated solution.

Figure 22:
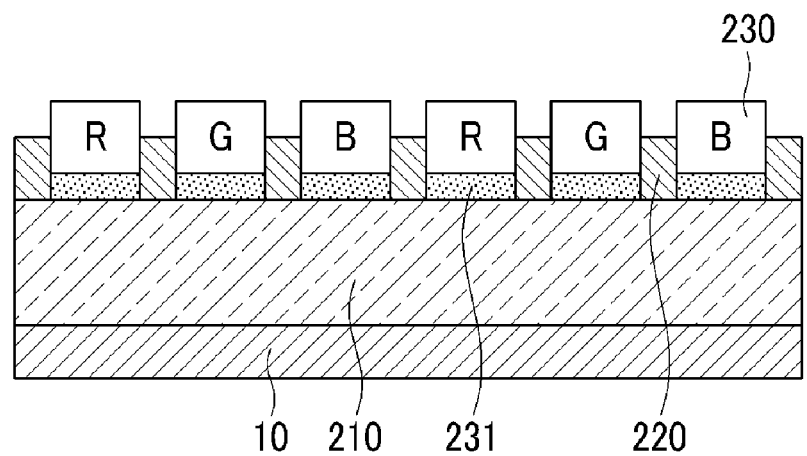

Referring to FIG. 22, the plurality of color filters 230 are formed on the conductive particle 231. The plurality of color filters 230 are disposed in regions surrounded by the conductive light blocking member 220. The color filter 230 may be formed by coating and curing a photoresist (PR) that may include pigments of red, green, and blue using a method such as an inkjet or a photolithographic process.

Figure 23:
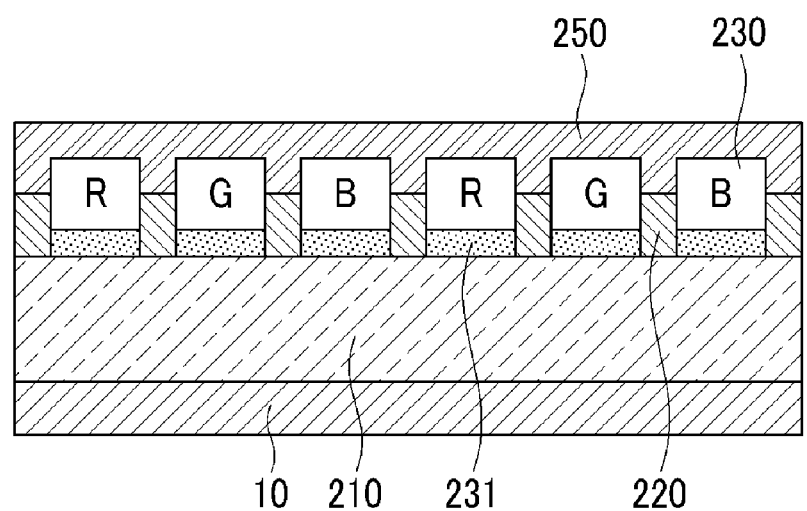

Referring to FIG. 23, the overcoat 250 is formed on the color filter 230 and conductive light blocking member 220. The overcoat 250 may be formed by coating and curing an organic insulator.

The overcoat 250 is formed and thereafter, the opposed electrode is formed on the overcoat 250 to complete the color filter layer of FIG. 19.

Figure 24:
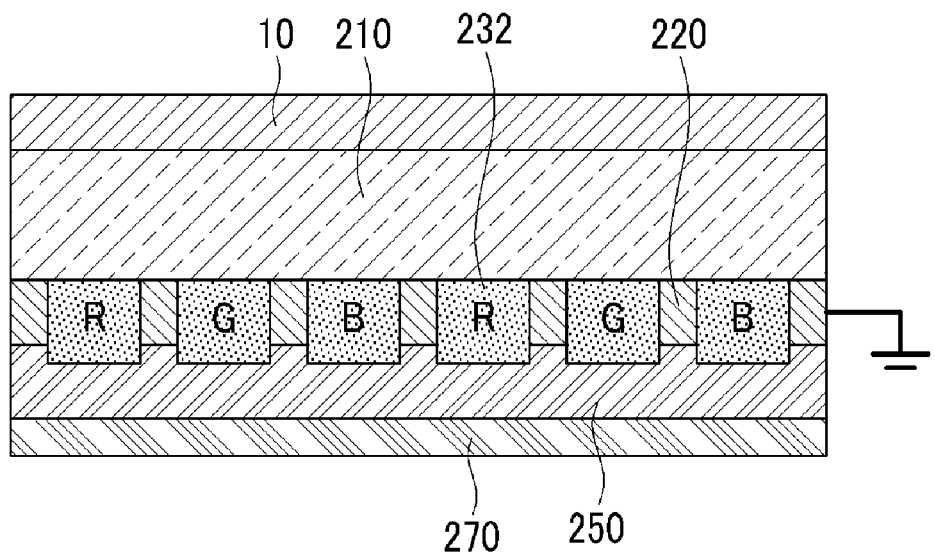
FIG. 24 is a cross-sectional view of a color filter layer according to another exemplary embodiment of the present invention.

FIG. 24 is a cross-sectional view of a color filter layer according to another exemplary embodiment of the present invention.

Referring to FIG. 24, the touch sensor layer 10 is formed on the first surface of the substrate 210, and a color filter layer that includes the conductive light blocking member 220, a conductive color filter 232, the overcoat 250, and an opposed electrode 270 is formed on the second surface of the substrate 210.

The conductive light blocking member 220 having a plurality of openings is formed on the substrate 210.

A plurality of conductive color filters 232 is formed in the openings of the conductive light blocking member 220 on the substrate 210, and the conductive color filters 232 are disposed in regions surrounded by the conductive light blocking member 220. The conductive color filter 232 includes a photoresist PR that includes the conductive particle and the pigments, e.g., red, green, and blue colored pigments. The conductive particle may be a transparent conductive particle that has a size ranging from 5 nm to 70 nm or 200 nm or less such as ITO, IZO, FTO, or the like. The conductive color filter 232 may be formed by coating and curing using an inkjet or photolithographic process.

On the conductive light blocking member 220 and the conductive color filter 232, the overcoat 250 is formed, and the opposed electrode 270 is formed on the overcoat 250.

The conductive light blocking member 220 and the conductive color filter 232 may form the conductive shielding layer, and the conductive shielding layer may be grounded or biased with an applied voltage.

When the conductive color filter 232 is used as in FIG. 24 in contrast to the color filter layer that includes the conductive particle of FIG. 19, the number of process steps may be decreased.

Figure 25:
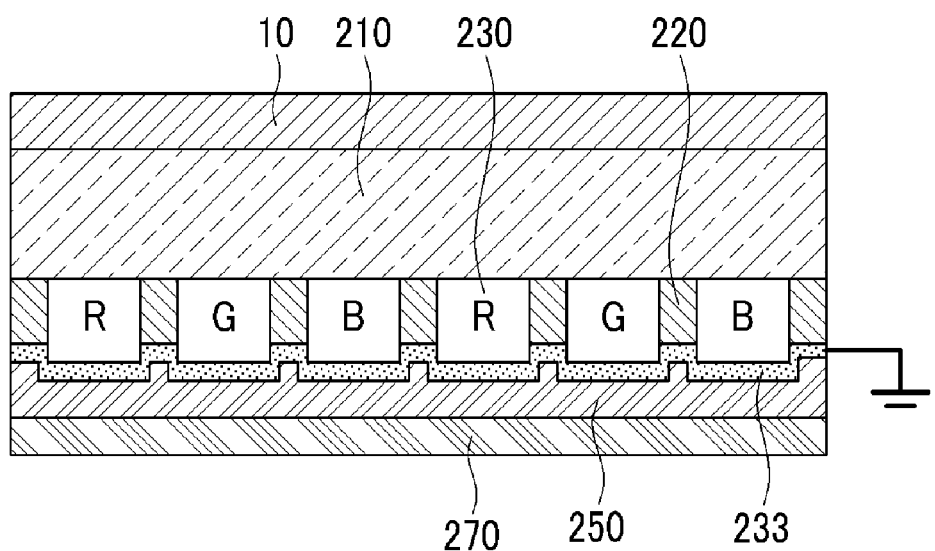
FIG. 25 is a cross-sectional view of a color filter layer according to another exemplary embodiment of the present invention.

FIG. 25 is a cross-sectional view of a color filter layer according to another exemplary embodiment of the present invention.

Referring to FIG. 25, the touch sensor layer 10 is formed on the first surface of the substrate 210, and a color filter layer that includes a light blocking member 220, a color filter 230, a conductive particle layer 233, the overcoat 250, and the opposed electrode 270 is formed on the second surface of the substrate 210.

The light blocking member 220, which has a plurality of openings, is formed on the substrate 210. In this case, the light blocking member 220 does not need to be conductive.

A plurality of color filters 230 are formed in the opening of the light blocking member 220 on the substrate 210, and the color filters 230 are disposed in the region surrounded by the light blocking member 220.

On the light blocking member 220 and color filter 230, the conductive particle layer 233 is formed. The conductive particle layer 233 may include a transparent conductive particle that has a size ranging 200 nm or less such as ITO, IZO, FTO, or the like. More preferably, the transparent conductive particle has a size raging from 5 nm to 70 nm. The conductive particle layer 233 may be formed by coating a solution that includes the conductive particle on the entire surface of the substrate 210 through an inkjet process and the like.

The overcoat 250 is formed on the conductive particle layer 233. The opposed electrode 270 is formed on the overcoat 250.

The conductive particle layer 233 may form the conductive shielding layer, and the conductive shielding layer may be grounded or biased with a voltage.

When the conductive particle layer 233 is coated onto the entire surface of the substrate 210 as in FIG. 25, it is unnecessary to align the conductive particle layer 233 with the opening of the conductive light blocking member 220 in order to coat the conductive particle 231 as in FIG. 19. In addition, since the conductive particle layer 233 is formed on the entire surface of the substrate 210, the light blocking member 220 does not need to be conductive.

Figure 26:
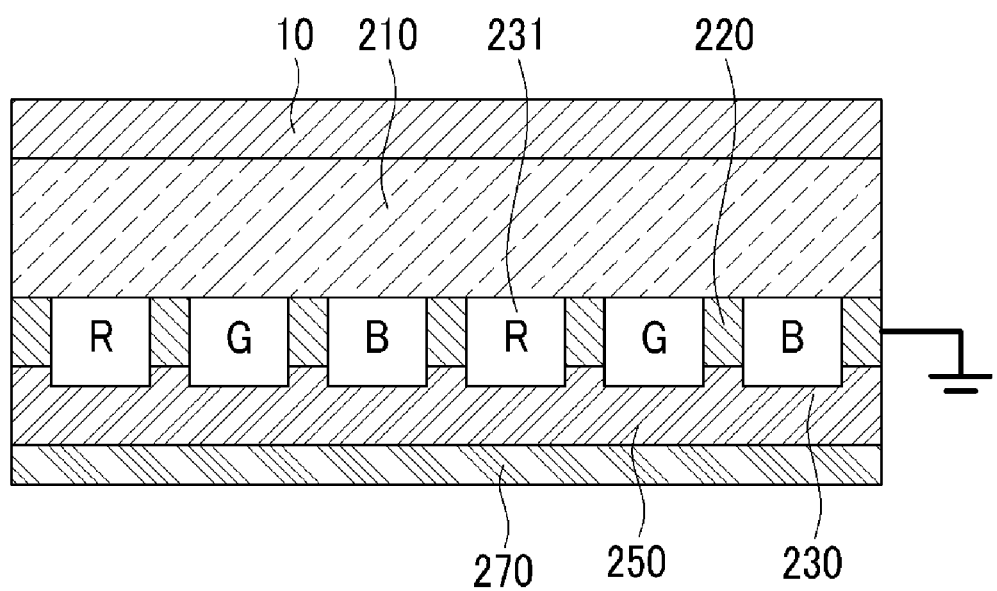
FIG. 26 is a cross-sectional view of a color filter layer according to another exemplary embodiment of the present invention.

FIG. 26 is a cross-sectional view of a color filter layer according to another exemplary embodiment of the present invention.

Referring to FIG. 26, the touch sensor layer 10 is formed on the first surface of the substrate 210, and a color filter layer that includes the conductive light blocking member 220, the color filter 230, the overcoat 250, and the opposed electrode 270 is formed on the second surface of the substrate 210. The conductive light blocking member 220 with a plurality of openings is formed on the substrate 210.

A plurality of color filters 230 is formed in the opening of the conductive light blocking member 220 on the substrate 210, and the color filters 230 are disposed in regions that are surrounded by the conductive light blocking member 220.

On the conductive light blocking member 220 and the color filter 230, the overcoat 250 is formed. The opposed electrode 270 is formed on the overcoat 250.

The conductive light blocking member 220 includes the plurality of openings, but if the openings are excluded, the conductive light blocking member 220 may be connected over the entire surface of the substrate 210 (see FIG. 18). Therefore, the conductive light blocking member 220 may form the conductive shielding layer all by itself. The conductive shielding layer may be grounded or biased with a voltage.

FIG. 26 may use the same method for forming the color filter layer as discussed above except that the conductive light blocking member 220 is included. The conductive light blocking member 220 may be grounded or biased with a voltage.

As described above, since the color filter layer includes the conductive shielding layer in various exemplary embodiments, it is possible to lower the noise that may affect the touch sensor layer. Hereinafter, the color filter layer that includes the conductive shielding layer is referred to as a conductive color filter layer.

The touch sensor layer and the color filter layer that are formed on different surfaces of the substrate are described above. However, the touch sensor layer and the color filter layer may be formed on the same surface of the substrate. Hereinafter, the case of the touch sensor layer and the color filter layer being formed on the same surface of the substrate is described.

Figure 27:
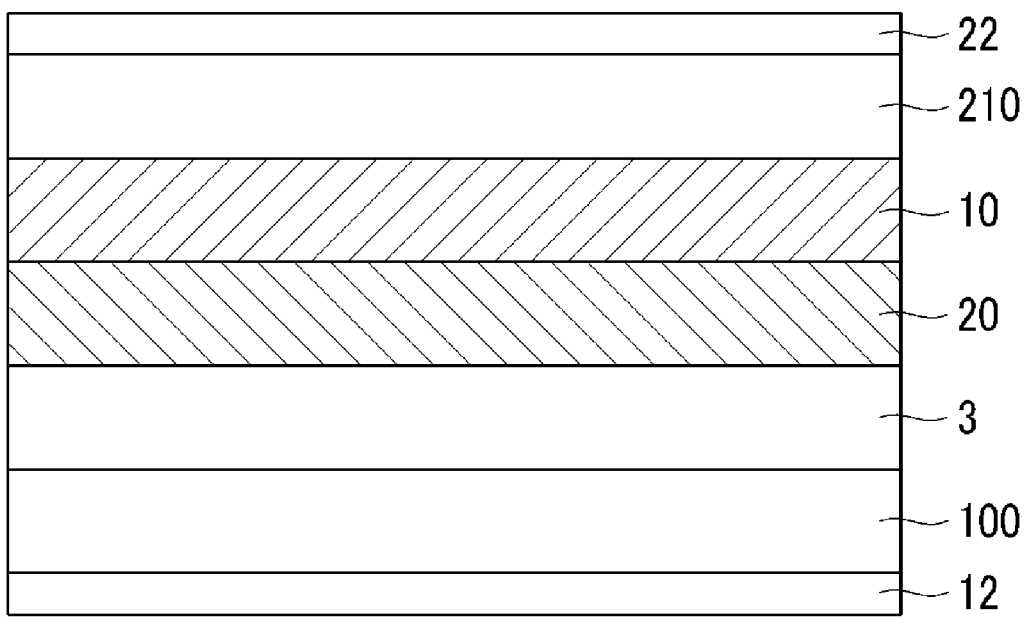
FIG. 27 is a cross-sectional view of a liquid crystal display that includes a touch sensor layer according to another exemplary embodiment of the present invention.

FIG. 27 is a cross-sectional view of a liquid crystal display that includes a touch sensor layer according to another exemplary embodiment of the present invention.

Referring to FIG. 27, the liquid crystal display includes a lower substrate 100, an upper substrate 210, and a liquid crystal layer 3 interposed therebetween. The upper substrate 210 includes a first surface that does not face the lower substrate 100 and a second surface facing the lower substrate 100. Polarizers 12 and 22 are provided on the external surfaces of the lower substrate 100 and the upper substrate 210. Transmissive axes of the polarizers 12 and 22 may be orthogonal to each other, and one of the polarizers 12 and 22 may be omitted.

The touch sensor layer 10 and color filter layer 20 are formed on the second surface of the substrate 210. The touch sensor layer 10 is formed between the substrate 210 and the color filter layer 20, and the color filter layer 20 is formed between the touch sensor layer 10 and the liquid crystal layer 3.

When the touch sensor layer 10 and color filter layer 20 are formed on the same surface of the substrate 210 as in FIG. 27, it is unnecessary to turn over the substrate 210 in order to form the touch sensor layer 10 on the first surface of the substrate 210 and to form the color filter layer 20 on the second surface as in FIG. 1.

However, when both the touch sensor layer 10 and the color filter layer 20 are formed on the same surface of the substrate 210 as in FIG. 27 (as compared to forming the touch sensor layer and the color filter layer on different surfaces of the substrate as in FIG. 1) the touch sensor layer 10 is more severely affected by signals that are generated from the color filter layer 20 and the lower substrate 100. Therefore, a method that may lower the noise affecting the touch sensor layer 10 may be beneficial.

In order to lower the noise affecting the touch sensor layer 10, as described above, a conductive color filter layer that includes a conductive shielding layer may be formed on the color filter layer 20.

Figure 28:
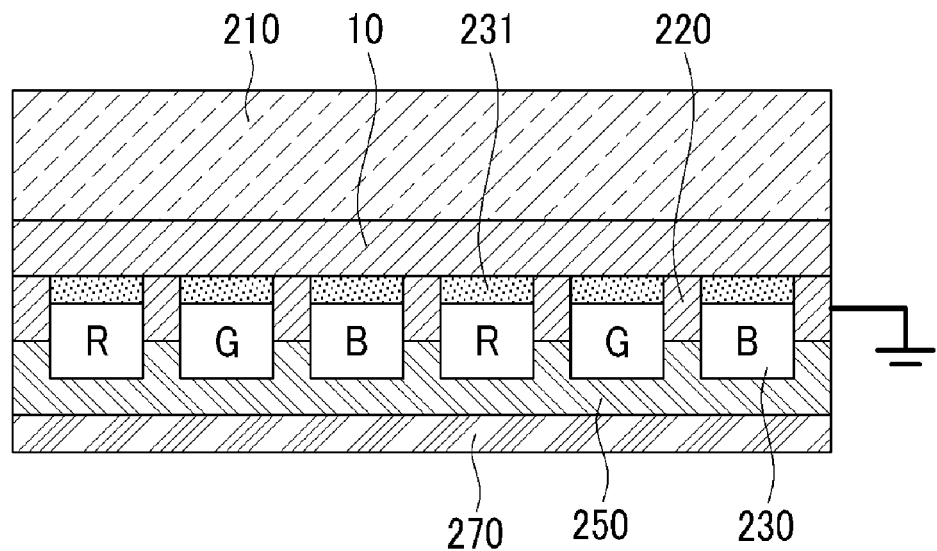
FIG. 28, FIG. 29, and FIG. 30 are cross-sectional views of a liquid crystal display panel on which a conductive shielding layer is formed.
Figure 29:
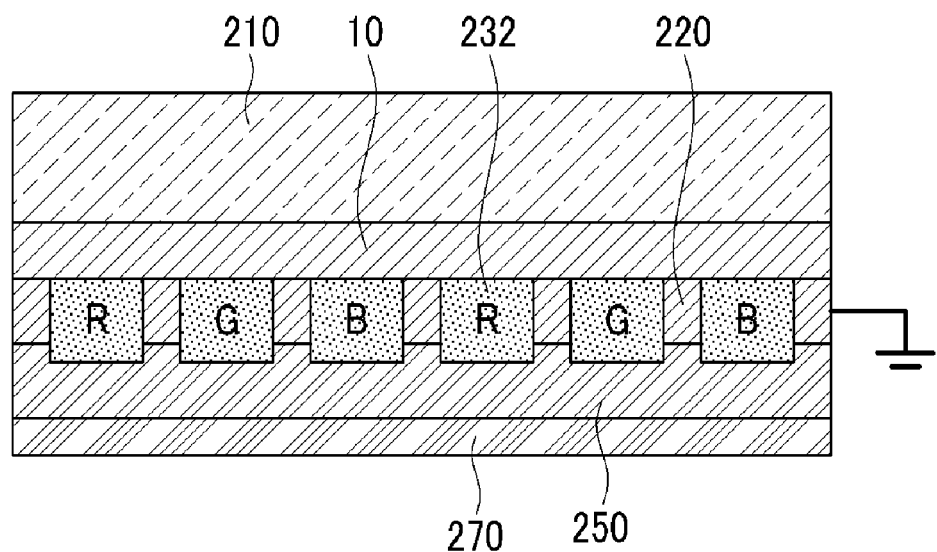
Figure 30:
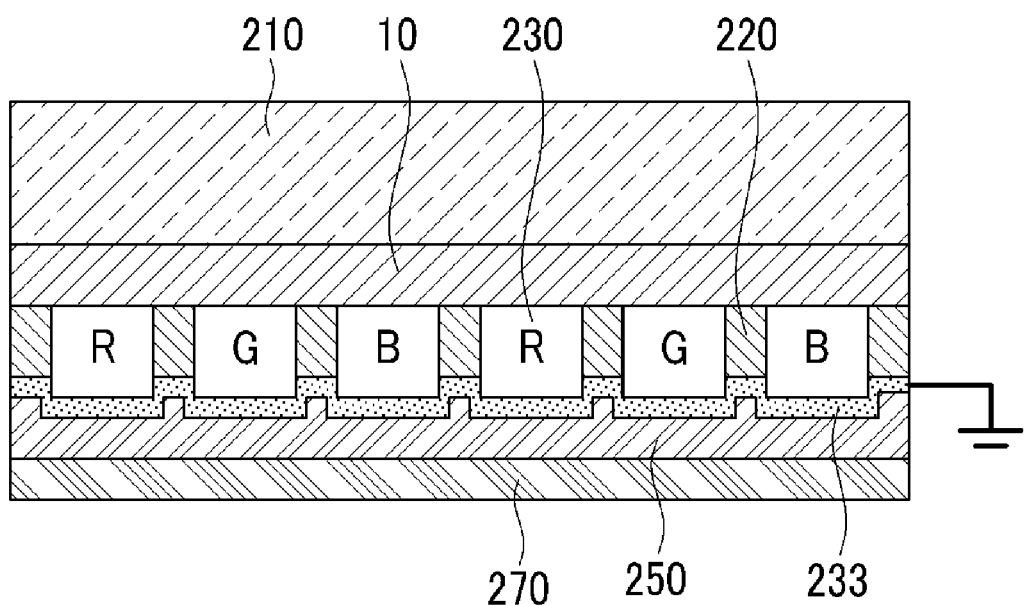

FIG. 28, FIG. 29, and FIG. 30 are cross-sectional views of a liquid crystal display panel on which a conductive shielding layer is formed.

FIG. 28 shows the conductive light blocking member 220 and the conductive particle 231 form the conductive shielding layer, and FIG. 28 is substantially similar to FIG. 19 except that the color filter layer is formed on the same surface of the substrate 210 as the touch sensor layer 10. Here, the touch sensor layer 10 is interposed between the substrate 210 and the conductive light blocking member 220.

FIG. 29 shows that the conductive light blocking member 220 and the conductive color filter 232 form the conductive shielding layer, which is substantially similar to FIG. 24 except that the color filter layer is formed on the same surface of the substrate 210 as the touch sensor layer 10. Here, the touch sensor layer 10 is interposed between the substrate 210 and the conductive shielding layer.

FIG. 30 shows the conductive particle layer 233 disposed on the light blocking member 220 and color filter 230 forms the conductive shielding layer. FIG. 30 is substantially similar to FIG. 25 except that the color filter layer is formed on the same surface of the substrate 210 as the touch sensor layer 10. Here, the touch sensor layer 10 is interposed between the substrate 210 and the conductive shielding layer.

As described above, it is possible to reduce a thickness and weight of a liquid crystal display by providing the liquid crystal display with a touch sensor layer. In addition, an integrated touch panel (as compared to an external touch panel that is attached to the outside of the liquid crystal display) may increase transmittance and decrease external light reflectivity, thereby preventing the degradation of image quality. In addition, it is possible to decrease the cost by manufacturing the touch sensor layer in conjunction with the liquid crystal display.

In addition, electrical noise generated from various circuit elements that drive the liquid crystal display that may affect the touch sensor layer may be mitigated by a conductive shielding layer formed at the time of fabricating a color filter layer. Consequently, the reliability of the touch sensor layer may be improved and may have increased sensitivity and precision.

In addition, exemplary embodiments of the present invention allow for a manufacturing process of the liquid crystal display where use of an additional substrate and an additional film is unneeded, thereby the production yield may be improved and costs may be lowered.

While this invention has been described in connection with exemplary embodiments, it will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display device, comprising:
   a first substrate having a first surface;
   a touch sensor layer disposed on the first surface of the first substrate,
   wherein the touch sensor layer comprises:
      a first electrode disposed on the first surface in a first direction;
      a second electrode disposed on the first surface in a second direction crossing the first direction and comprising a first portion and a second portion, the first portion and the second portion being separated by the first electrode;
      a bridge wire disposed on the first surface and comprising a first contact and a second contact, the first contact being electrically connected to the first portion of the second electrode, and the second contact being electrically connected to the second portion of the second electrode; and
      an insulating layer insulating the bridge wire from the first electrode and exposing the first contact and the second contact of the bridge wire.

2. The display device of claim 1, wherein the length of the insulating layer in the first direction is longer than the length of the bridge wire in the first direction, and the length of the insulating layer in the second direction is shorter than the length of the bridge wire in the second direction.

3. The display device of claim 1, wherein the insulating layer comprises a first contact hole and a second contact hole, the first contact hole exposes the first contact, and the second contact hole exposes the second contact.

4. The display device of claim 3, wherein the first contact hole and the second contact hole are both provided in plurality.

5. The display device of claim 4, wherein the first contact and the second contact of the bridge wire both extend in the second direction.

6. The display device of claim 1, wherein the first surface of the first substrate comprises an input region and a wire region,
   the first electrode and the second electrode are arranged in the input region,
   a first wire and a second wire are arranged in the wire region,
   a first end of the first wire is connected to the first electrode, and a first end of the second wire is connected to the second electrode,
   a second end of the first wire and a second end of the second wire are connected to a controller configured to transmit and receive a signal to and from the touch sensor layer.

7. The display device of claim 6, wherein the first wire and the second wire each respectively include a diagonal wire that connects portions disposed in the first direction to portions disposed in the second direction.

8. The display device of claim 6, wherein the second end of the first wire and the second end of the second wire are arranged at one side of the first substrate.

9. The display device of claim 6, wherein the first wire and the second wire comprise the same material and are disposed on the same layer as the bridge wire.

10. The display device of claim 9, further comprising a plurality of pad electrodes arranged in the same layer as the first electrode and the second electrode and comprising the same material as the first electrode and the second electrode, wherein each pad electrode is disposed on one of the second end of the first wire or the second end of the second wire.

11. The display device of claim 1, further comprising:
a second substrate facing a second surface of the first substrate, the first surface of the first substrate not facing the second substrate;
a pixel electrode disposed on the second substrate; and
an opposed electrode disposed on the second surface of the first substrate.

12. The display device of claim 1, further comprising a conductive color filter layer disposed on the second surface of the first substrate.

13. The display device of claim 12, wherein the conductive color filter layer is configured to receive a voltage.

14. The display device of claim 13, wherein the conductive color filter layer comprises a conductive light blocking member.

15. The display device of claim 1, further comprising:
a second substrate; and
a liquid crystal layer arranged between the first substrate and the second substrate,
wherein the first substrate further comprises a second surface facing the second substrate, and the first surface of the first substrate does not face the second substrate.

16. A method for manufacturing a liquid crystal display, the method comprising:
forming a bridge wire on a first surface of a second substrate having the first surface and a second surface;
forming an insulating layer that exposes a first contact and a second contact of the bridge wire;
forming a first electrode in a first direction on the first surface;
forming a second electrode on the first surface in a second direction that crosses the first direction, the second electrode comprising a first portion and a second portion that are separated by the first electrode;
arranging a first substrate to face the second surface of the second substrate; and
forming a liquid crystal layer between the first substrate and the second substrate,
wherein the first contact is electrically connected to the first portion of the second electrode, the second contact is electrically connected to the second portion of the second electrode, and the insulating layer insulates the bridge wire from the first electrode.

17. A liquid crystal display, comprising:
a first substrate;
a second substrate having a first surface that does not face the first substrate and a second surface facing the first substrate;
a liquid crystal layer arranged between the first substrate and the second substrate;
a touch sensor layer disposed on the first surface of the second substrate; and
a conductive color filter layer disposed on the second surface of the second substrate,
wherein the conductive color filter layer is configured to receive a voltage.

18. The liquid crystal display of claim 17, wherein the conductive color filter layer comprises:
a conductive light blocking member comprising a plurality of openings; and
a plurality of color filters arranged in the plurality of openings.

19. The liquid crystal display of claim 18, wherein the conductive color filter layer further comprises conductive particles arranged in the plurality of openings, and the plurality of color filters is disposed on the conductive particles.

20. The liquid crystal display of claim 18, wherein the plurality of color filters each comprise conductive particles.

21. The liquid crystal display of claim 17, wherein the conductive color filter layer comprises:
a light blocking member comprising a plurality of openings;
a plurality of color filters arranged in the plurality of openings; and
a conductive particle layer disposed on the light blocking member and the plurality of color filters.

22. A method for manufacturing a liquid crystal display, the method comprising:
forming a touch sensor layer on a first surface of a second substrate having the first surface and a second surface;
forming a conductive color filter layer on the second surface of the second substrate;
arranging a first substrate to face the second surface of the second substrate; and
forming a liquid crystal layer between the first substrate and the second substrate.

23. The method of claim 22, wherein the forming the conductive color filter layer comprises:
forming a conductive light blocking member comprising a plurality of openings on the second surface of the second substrate; and
forming a plurality of color filters in the plurality of openings.

24. The method of claim 23, further comprising, before forming the plurality of color filters, forming conductive particles in the plurality of openings.

25. The method of claim 23, wherein the plurality of color filters comprises conductive particles.

26. The method of claim 22, wherein forming the conductive color filter layer comprises:
forming a light blocking member comprising a plurality of openings on the second surface of the second substrate;
forming a plurality of color filters in the plurality of openings; and
forming a conductive particle layer on the light blocking member and the plurality of color filters.

27. A liquid crystal display, comprising:
a first substrate;
a second substrate having a first surface that does not face the first substrate and a second surface facing the first substrate;
a liquid crystal layer disposed between the first substrate and the second substrate;
a touch sensor layer disposed on the second surface of the second substrate; and
a conductive color filter layer disposed on the second surface of the second substrate,
wherein the conductive color filter layer is configured to receive a voltage.

28. The liquid crystal display of claim 27, wherein the conductive color filter layer comprises:
   a conductive light blocking member comprising a plurality of openings; and
   a plurality of color filters arranged in the plurality of openings.

29. The liquid crystal display of claim 28, wherein the conductive filter layer further comprises:
   conductive particles arranged in the plurality of openings; and
   the plurality of color filters is disposed on the conductive particles.

30. The liquid crystal display of claim 28, wherein the plurality of color filters comprises conductive particles.

31. The liquid crystal display of claim 27, wherein the conductive color filter layer comprises:
   a light blocking member comprising a plurality of openings;
   a plurality of color filters arranged in the plurality of openings; and
   a conductive particle layer disposed on the light blocking member and the plurality of color filters.

* * * * *